United States Patent
Kagami et al.

(10) Patent No.: US 7,598,203 B2
(45) Date of Patent: Oct. 6, 2009

(54) HYDROGENATION CATALYST FOR HYDROCARBON OIL, CARRIER FOR IT, AND METHOD OF HYDROGENATION OF HYDROCARBON OIL

(75) Inventors: Narinobu Kagami, Sodegaura (JP); Ryuichiro Iwamoto, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 287 days.

(21) Appl. No.: 11/623,782

(22) Filed: Jan. 17, 2007

(65) Prior Publication Data
US 2007/0135300 A1 Jun. 14, 2007

Related U.S. Application Data

(63) Continuation of application No. 09/868,628, filed as application No. PCT/JP00/07276 on Oct. 19, 2000, now abandoned.

(30) Foreign Application Priority Data

| Oct. 27, 1999 | (JP) | .................. 11-305769 |
| Apr. 3, 2000 | (JP) | ............................ 2000-100286 |
| Apr. 19, 2000 | (JP) | ............................ 2000-117548 |
| Apr. 25, 2000 | (JP) | ............................ 2000-123631 |

(51) Int. Cl.
*B01J 23/00* (2006.01)
*B01J 21/00* (2006.01)
*B01J 20/00* (2006.01)

(52) U.S. Cl. ............... 502/309; 502/242; 502/254; 502/255; 502/256; 502/257; 502/258; 502/259; 502/260; 502/261; 502/262; 502/313; 502/314; 502/315; 502/316; 502/319; 502/320; 502/321; 502/322; 502/323; 502/327; 502/350; 502/351; 502/355; 502/415; 502/439

(58) Field of Classification Search .................. 502/242, 502/254, 255, 256, 257, 258, 259, 260, 261, 502/262, 309, 313, 314, 315, 316, 319, 320, 502/321, 322, 350, 351, 355, 415, 439, 323, 502/327
See application file for complete search history.

(56) References Cited

U.S. PATENT DOCUMENTS 3,954,673 A 5/1976 Morimoto (Continued)

FOREIGN PATENT DOCUMENTS

| EP | 0 199 399 | 11/1986 |
| EP | 239056 | 9/1987 |
| EP | 0 339 640 | 11/1989 |
| EP | 339640 | 1/1990 |
| JP | 6-106061 | 4/1994 |
| JP | 8-243407 | 9/1996 |
| JP | 11-319567 | 11/1999 |
| WO | WO 96/41848 | 12/1996 |
| WO | WO 97/00305 | 1/1997 |

OTHER PUBLICATIONS

Derwent Abstracts, AN 1978-29596, XP-002288544, JP 53-025290, Mar. 8, 1978.

(Continued)

*Primary Examiner*—Cam N Nguyen
(74) *Attorney, Agent, or Firm*—Oblon, Spivak, McClelland, Maier & Neustadt, L.L.P.

(57) ABSTRACT

Provided are a hydrogenation catalyst for hydrocarbon oil, having markedly improved desulfurization activity, denitrogenation activity, and dearomatization activity; a carrier for the catalyst and its production; and a method of hydrogenation of hydrocarbon oil with the catalyst.

18 Claims, 1 Drawing Sheet

U.S. PATENT DOCUMENTS

| | | | |
|---|---|---|---|
| 4,018,714 A | 4/1977 | Wilson et al. | |
| 4,080,286 A | 3/1978 | Yanik et al. | |
| 4,260,524 A | 4/1981 | Yamada et al. | |
| 4,344,867 A | 8/1982 | Cull et al. | |
| 4,382,854 A | 5/1983 | Wilson et al. | |
| 4,448,896 A | 5/1984 | Kageyama et al. | |
| 4,525,267 A | 6/1985 | Inooka | |
| 4,720,472 A | 1/1988 | Parrott | |
| 4,743,359 A | 5/1988 | Ting et al. | |
| 4,798,666 A | 1/1989 | Parrott | |
| 4,831,004 A | 5/1989 | Brandes et al. | |
| 4,870,044 A | 9/1989 | Kukes et al. | |
| 4,895,816 A | 1/1990 | Gardner et al. | |
| 5,190,642 A | 3/1993 | Wilson et al. | |
| 5,198,100 A | 3/1993 | Aldridge et al. | |
| 5,229,347 A | 7/1993 | Prada et al. | |
| 5,254,240 A | 10/1993 | Galiasso et al. | |
| 5,316,996 A | 5/1994 | Itoh | |
| 5,516,851 A | 5/1996 | Flick et al. | |
| 5,719,097 A * | 2/1998 | Chang et al. | 502/325 |
| 5,733,840 A | 3/1998 | Szymanski et al. | |
| 5,869,187 A | 2/1999 | Nakamura et al. | |
| 5,891,821 A | 4/1999 | Poulet et al. | |
| 6,197,991 B1 * | 3/2001 | Spivack et al. | 558/274 |
| 6,228,801 B1 * | 5/2001 | Hums et al. | 502/350 |
| 6,280,610 B1 | 8/2001 | Uragami et al. | |
| 6,284,314 B1 | 9/2001 | Kato et al. | |
| 6,402,989 B1 | 6/2002 | Gaffney | |
| 6,420,587 B2 * | 7/2002 | Spivack et al. | 558/274 |
| 6,635,599 B1 | 10/2003 | Eijsbouts et al. | |

OTHER PUBLICATIONS

Derwent Abstracts, AN 1994-300076, XP-002288545, JP 6-228572, Aug. 16, 1994.

T. Klimova, et al., Journal of Materials Science, vol. 33, XP-000741790, pp. 1981-1990, "Organic Polymers as Pore-Regualting Agents in $TiO_2$-$Al_2O_3$ Mixed Oxide Catalytic Supports", Apr. 15, 1998.

J. Ramirez, et al., Applied Catalysis A: General, vol. 93, XP-001181704, pp. 163-180, "Titania-Alumina Mixed Oxides as Supports for Molybdenum Hydrotreating Catalysts", 1993.

Z. B. Wei, et al., Applied Catalysis A: General, vol. 167, No. 1, XP-004338380, pp. 39-48, "Hydrodesulfurization Activity of NiMo/$TiO_2$-$Al_2O_3$ Catalysts", Feb. 5, 1998.

E. Olguin, et al., Applied Catalysis A: General, vol. 165, No. 1-2, XP-004338301, pp. 1-13, "The Use of $TiO_2$-$Al_2O_3$ Binary Oxides as Supports for Mo-Based Catalysts in Hydrodesulfurization of Thiophene and Dibenzothiophene", Dec. 31, 1997.

J.M. Lewis, et al., "The $MoO_3$-$Al_2O_3$ Interaction: Influence of Phosphorus on $MoO_3$ Impregnation and Reactivity in Thiophene HDS," Journal of Catalysis 136, pp. 478-486 (1992).

* cited by examiner

HYDROGENATION CATALYST FOR HYDROCARBON OIL, CARRIER FOR IT, AND METHOD OF HYDROGENATION OF HYDROCARBON OIL

This is a continuation application of U.S. application Ser. No. 09/868,628, filed Jun. 26, 2001, which is a 371 of PCT/JP00/07276 filed on Oct. 19, 2000.

TECHNICAL FIELD

The present invention relates to a hydrogenation catalyst for hydrocarbon oil and a method of hydrogenation of hydrocarbon oil, in particular to a hydrogenation catalyst effective as a hydro-desulfurization catalyst, a hydro-denitrogenation catalyst and a hydro-dearomatization catalyst for hydrocarbon oil that includes gas oil, kerosene and other fractions, and also to a method of hydrogenation of such hydrocarbon oil.

The invention further relates to a metal compound-loading refractory inorganic oxide carrier, and its production and use, more precisely to a metal compound-loading refractory inorganic oxide carrier useful especially for catalysts and adsorbents, and to its production and use.

BACKGROUND ART

The recent global destruction of the environment is a matter of grave concern. In particular, nitrogen oxides (NOx) and sulfur oxides (SOx) released in air from burning fossil fuel such as coal and oil produce acid rain and acid fog which seriously destroy the environment of forests, lakes, marshes, etc. Above all, SOx are serious. SOx could be reduced in some degree by post-treatment, but it is important to efficiently remove sulfur from fuel oil. From the viewpoint of the protection of the environment, the regulation of gas oil in point of its sulfur content is much intensified, for which it is desired to develop a hydrogenation catalyst having a higher desulfurization activity.

Heretofore, a catalyst prepared from cobalt and molybdenum supported on a refractory inorganic oxide carrier such as alumina has been used for hydro-desulfurization of gas oil. It is known that the desulfurization activity of the catalyst significantly depends on the condition of the active metal, molybdenum therein. For improving the state of molybdenum on the catalyst, other carriers than alumina and alumina compounded oxide carriers have been investigated for the catalyst. Of these, it is known that a titania component improves the desulfurization activity of the catalyst. A method of applying titanium to an alumina carrier; and a method of co-precipitating alumina and titania are known.

Heretofore used are catalysts having an active metal of, for example, cobalt, nickel, molybdenum or tungsten supported on a refractory inorganic oxide carrier such as alumina. For improving the activity of the catalysts, methods of using an additional metal component, titanium have been proposed (Applied Catalysis, 63 (1990) 305-317; Japanese Patent Laid-Open No. 106061/1994). In these methods, however, the condition of titanium held in the carrier is not the most suitable, and the activity of the catalyst could not be improved satisfactorily.

For shaped articles of refractory inorganic oxides, heretofore known are extrusion moldings, spherical articles and honeycomb articles. In case where these shaped articles are used as carriers specifically for catalysts and adsorbents, generally employed is a method of applying thereto an active ingredient, an ingredient serving as a catalyst promoter to accelerate the activity or an ingredient for promoting adsorption, and a third ingredient for controlling the properties of the shaped article serving as a carrier.

In the system of the above where the reaction and adsorption to be occurred not only on the outer surface of the shaped article but also even inside the pores of the shaped article is an extremely important factor, the technique of uniformly introducing the ingredient participating in the reaction and adsorption into the deep inside of the shaped article is a matter of great importance.

However, to the case where the interaction between the ingredient and the shaped article serving as a carrier is extremely strong, a problem will occur that the ingredient is held only on the outer surface of the shaped article and could not uniformly penetrate into the pores existing inside the shaped article.

Concretely, the problem is as follows: When a metal compound to be carried by a refractory inorganic oxide carrier is applied to the carrier by impregnation method using the metal compound solution, and if the interaction between the metal compound and the carrier is strong, the carrier strongly adsorbs the metal compound or the metal compound is rapidly hydrolyzed on the carrier, and, as a result, the metal compound is held only on the outer surface of the shaped article, carrier and could not uniformly penetrate into the pores existing inside the shaped article.

Therefore, in the conventional method, the active ingredient is held only on the outer surface of the refractory inorganic oxide carrier, and could not effectively exhibit its ability expected for the intended reaction. In addition, another problem with the method is that the active ingredient, if segregated only on the outer surface of the shaped article, carrier, interferes with the diffusion of the reaction product into the pores inside the carrier.

For applying titanium to an alumina carrier, investigated are (1) a method of impregnation of alumina with an aqueous solution of titanium tetrachloride, (2) a method of impregnation of alumina with an isopropanol solution of titanium isopropoxide (Applied Catalysis, 63 (1990) 305-317), and (3) a method of chemical vapor deposition of a vapor of saturated titanium tetrachloride onto alumina under heat (Japanese Patent Laid-Open No. 106061/1994).

Both the method of applying titanium to an alumina carrier and the method of co-precipitating alumina and titania mentioned above include a step of applying an active metal of Group 6 and an active metal of Groups 8 to 10 of the Periodic Table to the carrier followed by calcining the metal-loading catalyst at a high temperature of around 500° C. or so, in which the active metals on the titania often agglomerate. This is problematic, as lowering the catalyst activity.

The method (2) requires the alcohol and is therefore uneconomical as the alcohol used must be recovered therein. The method (3) differs from ordinary impregnation methods where a solution is used. In this, a vapor of the starting material for the active ingredient is introduced into the reaction system, in which the vapor introduced is decomposed and deposited on the carrier having been controlled at a certain temperature. Therefore, this will require a complicated and troublesome apparatus for temperature control and process control. In addition, in this, chlorine deposits on the carrier and will produce hydrogen chloride gas when the refractory inorganic oxide carrier is processed at a high temperature in a reducing atmosphere, and the hydrogen chloride is troublesome as it corrodes the apparatus used.

On the other hand, the method of co-precipitating alumina and titania is uneconomical, since the titania could not sufficiently exhibit its effect if its amount is not large, for example, if smaller than 15% by weight.

In the methods (1) and (2), the active ingredient could not uniformly penetrate into the pores inside the shaped article of alumina, and therefore could not satisfactorily exhibit its effect. The method (3) differs from ordinary impregnation methods where a solution is used. In this, a vapor of the starting material for the active ingredient is introduced into the reaction system, in which the vapor introduced is decomposed and deposited on the carrier having been controlled at a certain temperature. Therefore, this will require a complicated and troublesome apparatus for temperature control and process control. In addition, in this, chlorine deposits on the carrier and will produce hydrogen chloride gas when the refractory inorganic oxide carrier is processed at a high temperature in a reducing atmosphere, and the hydrogen chloride is troublesome as it corrodes the apparatus used.

The present invention has been made in consideration of the above-mentioned matters, and its object is to provide a hydrogenation catalyst having higher desulfurization activity, denitrogenation activity and dearomatization activity, to provide a method of using the catalyst for hydrogenation of hydrocarbon oil, and to provide a metal compound-loading refractory inorganic oxide carrier in which the metal exists uniformly everywhere inside it.

DISCLOSURE OF THE INVENTION

We, the present inventors have assiduously studied, and, as a result, have found that, when a solution containing a water-soluble metal compound of Group 4 of the Periodic Table is impregnated on a refractory inorganic oxide carrier it carries the metal compound, and further an aqueous solution containing at least one metal compound of Group 6 and at least one metal compound of Groups 8 to 10 of the Periodic Table is impregnated on the resulting carrier so that it further carries the metal compounds, and thereafter this is heated at a temperature not higher than 300° C., then the object of the invention can be effectively attained. In particular, we have found that, when the step of processing the carrier with a metal compound of Group 4 of the Periodic Table is so defined that the carrier processed carries titanium, then the object of the invention can be more effectively attained. In addition, we have further found that, when an aqueous solution that contains a water-soluble organic compound having a boiling point or a decomposition point of not lower than 150° C. is impregnated on a refractory inorganic oxide carrier, and dried, and thereafter a solution of a metal compound further is impregnated, then the metal can uniformly penetrate to the depths of the carrier and the metal compound-loading refractory inorganic oxide carrier can also effectively attain the object of the invention. On the basis of these findings, we have completed the present invention.

Specifically, the invention is summarized as follows:

1. A hydrogenation catalyst for hydrocarbon oil, which is produced by impregnating a refractory inorganic oxide carrier with a solution containing a water-soluble metal compound of Group 4 of the Periodic Table so that it carries the metal compound, then further impregnating with an aqueous solution containing at least one metal compound of Group 6 and at least one metal compound of Groups 8 to 10 of the Periodic Table so that it carries the metal compounds, and thereafter heating it at a temperature not higher than 300° C.

2. The hydrogenation catalyst for hydrocarbon oil of above 1, wherein the metal compound of Group 4 of the Periodic Table is a titanium compound.

3. The hydrogenation catalyst for hydrocarbon oil of above 2, wherein the titanium compound is a salt of a titanium-peroxohydroxycarboxylic acid.

4. A hydrogenation catalyst for hydrocarbon oil, which is produced by impregnating a refractory inorganic oxide carrier with an aqueous solution containing a salt of a titanium-peroxohydroxycarboxylic acid so that it carries the titanium compound, then further impregnating with an aqueous solution containing at least one metal compound of Group 6 and at least one metal compound of Groups 8 to 10 of the Periodic Table so that it carries the metal compounds.

5. The hydrogenation catalyst for hydrocarbon oil of any of above 1 to 4, wherein the refractory inorganic oxide is alumina.

6. The hydrogenation catalyst for hydrocarbon oil of any of above 2 to 5, in which the amount of titanium in terms of its oxide falls between 1 and 15% by weight of the refractory inorganic oxide carrier.

7. The hydrogenation catalyst for hydrocarbon oil of any of above 1 to 6, wherein the metal of Group 6 of the Periodic Table is molybdenum and the metal of Groups 8 to 10 of the Periodic Table is nickel.

8. The hydrogenation catalyst for hydrocarbon oil of any of above 1 to 7, which carries a phosphorus compound along with the metal compound of Group 6 and the metal compound of Groups 8 to 10 of the Periodic Table.

9. A method of hydrogenation of hydrocarbon oil, in which is used the hydrogenation catalyst of any of above 1 to 8.

10. A method for producing a hydrogenation catalyst, which comprises applying a water-soluble organic compound having a boiling point or a decomposition point of not lower than 150° C. to a refractory inorganic oxide carrier, then applying thereto a metal compound of Group 4 of the Periodic Table, and thereafter further applying thereto at least one metal compound of Group 6 and at least one metal compound of Groups 8 to 10 of the Periodic Table.

11. The method for producing a hydrogenation catalyst of above 10, wherein the catalyst produced is for hydro-desulfurization.

12. A method for producing a hydrogenation catalyst, which comprises applying a metal compound of Group 4 of the Periodic Table to a refractory inorganic oxide carrier, along with a water-soluble organic compound having a boiling point or a decomposition point of not lower than 150° C. thereto, and thereafter further applying thereto at least one metal compound of Group 6 and at least one metal compound of Groups 8 to 10 of the Periodic Table.

13. The method for producing a hydrogenation catalyst of above 12, wherein the catalyst produced is for hydro-denitrogenation.

14. A method for producing a hydrogenation catalyst, which comprises applying at least one metal compound of Group 6 and at least one metal compound of Groups 8 to 10 of the Periodic Table to a refractory inorganic oxide carrier, along with a water-soluble organic compound having a boiling point or a decomposition point of not lower than 150° C. thereto, and thereafter further applying thereto a metal compound of Group 4 of the Periodic Table.

15. The method for producing a hydrogenation catalyst of above 14, wherein the catalyst produced is for hydro-dearomatization.

16. The method for producing a hydrogenation catalyst of any of above 10 to 15, wherein a phosphorus compound is applied to the refractory inorganic oxide carrier, along with the metal compound of Group 6 and the metal compound of Groups 8 to 10 of the Periodic Table thereto.

17. The method for producing a hydrogenation catalyst of any of above 10 to 16, wherein the metal of Group 4 of the Periodic Table is titanium or zirconium.

18. The method for producing a hydrogenation catalyst of any of above 10 to 17, wherein the metal of Group 6 of the Periodic Table is molybdenum or tungsten, and the metal of Groups 8 to 10 of the Periodic Table is cobalt or nickel.

19. The method for producing a hydrogenation catalyst of any of above 10 to 18, wherein the refractory inorganic oxide carrier is alumina.

20. The method for producing a hydrogenation catalyst of any of above 10 to 19, wherein the water-soluble organic compound having a boiling point or a decomposition point of not lower than 150° C. is at least one selected from diethylene glycol, triethylene glycol, polyethylene glycol and butanediol.

21. A hydrogenation catalyst produced in the method of any of above 10 to 20.

22. A method of hydrogenation of hydrocarbon oil, in which is used the hydrogenation catalyst of above 21.

23. A metal compound-loading refractory inorganic oxide carrier produced by impregnating a refractory inorganic oxide carrier with a metal compound and carrying the metal, in which the metal exists uniformly everywhere inside it.

24. A metal compound-loading refractory inorganic oxide carrier produced by impregnating a refractory inorganic oxide carrier with a metal compound and carrying the metal, of which the ratio, x=Fm/F, is at least 0.5 in the graph indicating the data of linear analysis of the metal atom in one direction obtained through electron probe microanalysis (EPMA) of the cross section of the carrier, and showing the relationship between the length, t, of the cross section in the cross direction of the carrier (t indicates the distance from one surface of the carrier) and the X-ray intensity, I, in which F indicates the integral value of the X-ray intensity I(t) with t being the distance between one surface of the carrier and the other surface thereof, and Fm indicates the integral value of the X-ray intensity Im(t) on the line tangential to the X-ray intensity curve at the minimum and smallest point of the curve, with t being also the distance between one surface of the carrier and the other surface thereof.

25. The metal compound-loading refractory inorganic oxide carrier of above 23 or 24, wherein the refractory inorganic oxide carrier is γ-alumina.

26. The metal compound-loading refractory inorganic oxide carrier of any of above 23 to 25, wherein the metal compound is a metal alkoxide.

27. The metal compound-loading refractory inorganic oxide carrier of any of above 23 to 26, wherein the metal is of Group 4 of the Periodic Table.

28. The metal compound-loading refractory inorganic oxide carrier of above 27, wherein the metal of Group 4 of the Periodic Table is titanium.

29. A method for producing the metal compound-loading refractory inorganic oxide carrier of any of above 23 to 28, which comprises impregnating a refractory inorganic oxide carrier with an aqueous solution that contains a water-soluble organic compound having a boiling point or a decomposition point of not lower than 150° C., then drying it, and thereafter further impregnating with a solution of a metal compound.

30. A method for producing the metal compound-loading refractory inorganic oxide carrier of any of above 26 to 28, which comprises impregnating a refractory inorganic oxide carrier with an aqueous solution that contains a water-soluble organic compound having a boiling point or a decomposition point of not lower than 150° C., then drying it, and thereafter further impregnating with an alcoholic solution of a metal compound, metal alkoxide.

31. A hydrogenation catalyst having at least one metal of Group 6 and at least one metal of Groups 8 to 10 of the Periodic Table supported on the metal compound-loading refractory inorganic oxide carrier of any of above 23 to 28.

32. A hydrogenation catalyst having at least one metal of Group 6 and at least one metal of Groups 8 to 10 of the Periodic Table supported on the metal compound-loading refractory inorganic oxide carrier of any of above 23 to 28, which is heated at a temperature not higher than 300° C.

33. A method of hydro-desulfurization of hydrocarbon oil, in which is used the hydrogenation catalyst of above 31 or 32.

BEST MODES OF CARRYING OUT THE INVENTION

Figure 1:
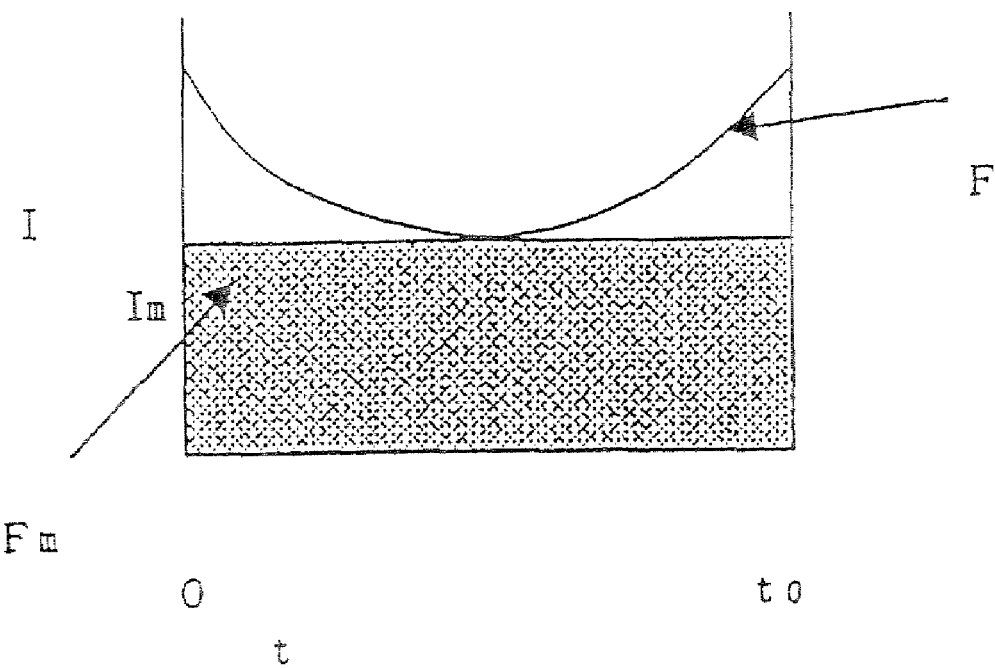
FIG. 1 is a graph indicating the data of linear analysis obtained through EPMA of the metal atom in one example of the metal compound-loading refractory inorganic oxide carrier of the invention, and this shows the relationship between the length, t, of the cross section in the cross direction of the carrier and the X-ray intensity, I.

The invention is described in detail hereinunder.

The invention is a hydrogenation catalyst for hydrocarbon oil, which is produced by impregnating a refractory inorganic oxide carrier with a solution containing a water-soluble metal compound of Group 4 of the Periodic Table so that it carries the metal compound, then further impregnating with an aqueous solution containing at least one metal compound of Group 6 and at least one metal compound of Groups 8 to 10 of the Periodic Table so that it carries the metal compounds, and thereafter heating it at a temperature not higher than 300° C.

The refractory inorganic oxide carrier for use in the invention includes alumina, silica, silica-alumina, magnesia, zinc oxide, crystalline aluminosilicates, clay minerals and their mixtures. Above all, preferred is alumina, and more preferred is γ-alumina. Preferably, the mean pore size of the carrier falls between 50 and 150 angstroms, more preferably between 60 and 140 angstroms. Regarding its morphology, the carrier may be powdery, or may be shaped to have, for example, a columnar, three-leaved or four-leaved pellet.

The metal of Group 4 of the Periodic Table to be supported by the refractory inorganic oxide includes titanium and zirconium, and titanium is preferred. Preferred examples of the water-soluble metal compound of Group 4 of the Periodic Table are water-soluble titanium compounds and water-soluble zirconium compounds, such as titanium sulfate, titanium chloride, titanium peroxide, titanium oxalate, titanium acetate, zirconium oxychloride, zirconium sulfate, zirconium nitrate, zirconium acetate, zirconium ammonium carbonate.

For applying the metal compound of Group 4 of the Periodic Table to the carrier, employable is a method of preparing a solution of the metal compound in such a controlled manner that the amount of the solution is enough for the carrier to absorb the solution, and impregnating the carrier with the solution (pore-filling method); or a method of dipping the carrier in a large excessive amount of a solution of the metal compound. Dipping the carrier in the solution of the metal compound may be effected under atmospheric pressure or under reduced pressure.

To prepare the impregnation solution, the metal compound is dissolved in water, or in an aqueous hydrochloric acid or sulfuric acid solution, and is stabilized therein. For the water-soluble titanium compound for titanium to be impregnated, especially preferred is a titanium-peroxohydroxycarboxylic acid or its ammonium salt, as it facilitates the introduction of titanium into the carrier. The hydroxycarboxylic acid includes citric acid, malic acid, lactic acid and tartaric acid.

The amount of the metal of Group 4 of the Periodic Table to be supported by the refractory inorganic oxide carrier preferably falls, in terms of its oxide, between 0.5 and 30% by weight, more preferably between 1 and 15% by weight of the carrier. If its amount is too small, the metal could not satisfactorily exhibit its effect; but if too large, the metal compound impregnation solution is thick and unstable and the metal will segregate or agglomerate on the carrier, and therefore it is unfavorable.

After having been soaked with a impregnation solution of the metal compound of Group 4 of the Periodic Table, the carrier is dried under atmospheric pressure or under reduced pressure, preferably at a temperature falling between 50 and 150° C., more preferably between 100 and 120° C., for a period of time falling between 0.5 and 100 hours so as to remove water from it. Further, in order to enhance the bonding force of the metal compound to the carrier, e.g., alumina carrier, the carrier is optionally calcined. The temperature for calcination preferably falls between 400 and 650° C., more preferably between 450 and 600° C.; and the calcination time generally falls between 0.5 and 100 hours.

In case where the metal compound solution contains anions of sulfate or chloride, it is desirable that the amount of the anions therein is at most 5% by weight, in order that the dispersion of the active metal becomes higher on the carrier in the next step and that the activity of the catalyst is higher. For this, water vapor is added to the air atmosphere in which the carrier is calcined, or the carrier is washed with water or with water that contains ammonia or ammonium carbonate, before it is dried or after it has been calcined. When the carrier is washed after calcined, it must be again dried.

Finally, at least one of active metal compound of Group 6 and at least one active metal compound of Groups 8 to 10 of the Periodic table, and optionally a phosphorus compound are applied to the carrier.

The metal of Group 6 of the Periodic Table is preferably molybdenum or tungsten, more preferably molybdenum. The molybdenum compound includes, for example, molybdenum trioxide, and ammonium para-molybdate. The tungsten compound includes, for example, tungsten trioxide, and ammonium tungstate. The amount of the metal to be loaded on the carrier preferably falls, in terms of its oxide, between 4 and 40% by weight, more preferably between 8 and 35% by weight of the catalyst.

The metal of Groups 8 to 10 of the Periodic Table is generally cobalt or nickel. The nickel compound for use herein includes, for example, nickel nitrate and nickel carbonate; and the cobalt compound includes, for example, cobalt nitrate and cobalt carbonate. The amount of the metal to be loaded on the carrier preferably falls, in terms of its oxide, between 1 and 12% by weight, more preferably between 2 and 10% by weight of the catalyst.

The phosphorus compound for use herein includes, for example, phosphorus pentoxide and ortho-phosphoric acid. The amount of the compound to be loaded on the carrier preferably falls, in terms of its oxide, between 0.5 and 8% by weight, more preferably between 1 and 6% by weight of the catalyst.

The active metal compounds are applied to the carrier by impregnating the carrier with their solutions. The carrier may be soaked by sequential impregnation with different solutions of the three groups of the metal compound of Group 6 of the Periodic Table, the metal compound of Groups 8 to 10 of the Periodic Table, and the phosphorus compound, but is preferably soaked by co-impregnation with one solution containing all the compounds. The metal compounds are dissolved in pure water in such a ratio that the metal of Group 6 of the Periodic Table is from 0.7 to 7.0 mols/liter, the metal of Groups 8 to 10 of the Periodic Table is from 0.3 to 3.6 mols/liter, and the phosphorus compound is from 0 to 2.2 mols/liter, and the amount of the resulting solution is so controlled that it is equivalent to the water absorption of the carrier. With that, the carrier is soaked with the impregnation solution. When the impregnation solution is acidic, its pH generally falls between 1 and 4, preferably between 1.5 and 3.5, in consideration of the stability of the impregnation solution. When the solution is alkaline, its pH generally falls between 9 and 12, preferably between 10 and 11. The method of pH control of the solution is not specifically defined. In general, an inorganic acid such as nitric acid, hydrochloric acid or sulfuric acid, or an organic acid such as malic acid, citric acid or ethylenediamine-tetraacetic acid, or ammonia is added to the solution.

Preferably, a water-soluble organic compound is added to the impregnation solution stabilized with a phosphorus compound.

The water-soluble organic compound includes, for example, diols such as 1,3-butanediol, 1,4-butanediol, butanetriol, 1,2-propanediol, 1,2-pentanediol; iso-alcohols having at least 4 carbon atoms, such as 5-methyl-1-hexanol, isoamyl alcohol (3-methyl-1-butanol), s-isoamyl alcohol (3-methyl-2-butanol), isoundecylene alcohol, isooctanol, isopentanol, isogeranol, isohexyl alcohol, 2,4-dimethyl-1-pentanol, 2,4,4-trimethyl-1-pentanol; alcohols having at least 5 carbon atoms and having a hydroxyl group bonded to the carbon except the terminal carbon, such as 2-hexanol, 3-hexanol; ether group-containing water-soluble polymers such as polyethylene glycol, polyoxyethylene phenyl ether, polyoxyethylene octylphenyl ether; water-soluble polymers such as polyvinyl alcohol; saccharides such as saccharose, glucose; water-soluble polysaccharides such as methyl cellulose, water-soluble starch; and their derivatives. One or more of these compounds may be added to the impregnation solution, either singly or as combined.

The amount of the water-soluble organic compound to be added to the carrier preferably falls between 2 and 20% by weight, more preferably between 3 and 15% by weight of the carrier.

After having been prepared by the impregnation, the resulting catalyst is heated for more stably fixing the active metals to the carrier. The temperature for the heat treatment is not higher than 300° C., and preferably falls between 70 and 300° C., more preferably between 80 and 150° C. If the temperature for the heat treatment is too high, the components held on the carrier will agglomerate and will fail to have high activity; but if too low, the components could not be firmly held on the carrier and will fail to have high activity. The heat treatment is effected in air, and generally takes from 3 to 16 hours.

In case where the refractory inorganic oxide carries a titanium-peroxohydroxycarboxylic acid or its ammonium salt, a type of titanium compound, it may be heated at 300° C. or higher.

The mean pore diameter of the catalyst obtained in the manner as above generally falls between 40 and 140 angstroms, preferably between 60 and 130 angstroms; and the specific surface area thereof generally falls between 120 and 400 m$^2$/g, preferably between 140 and 350 m$^2$/g. The total pore volume of the catalyst generally falls between 0.2 and 1.0 cc/g, preferably between 0.25 and 0.9 cc/g.

The mean pore diameter and the total pore volume are measured according to a method of mercury penetration; and the specific surface area is measured according to a method of nitrogen adsorption.

Another aspect of the invention is a method of using the catalyst for hydrogenation of hydrocarbon oil.

Prior to being used for hydrogenation, it is desirable that the catalyst is pre-sulfurized for stabilizing it. The condition for pre-sulfurization is not specifically defined. In general, hydrogen sulfide, carbon disulfide, thiophene or dimethyl disulfide is used as a pre-sulfurizing agent. The temperature for the treatment may fall between 200 and 400° C.; and the pressure may fall between atmospheric pressure and 30 MPa.

The condition for hydrogenation varies, depending on the type of the oil to be processed and on the use of the processed oil. In general, the reaction temperature falls between 200 and 550° C., preferably between 220 and 500° C.; and the hydrogen partial pressure falls between 1 and 30 MPa, preferably between 2 and 25 MPa.

The reaction mode is not specifically defined. In general, it may be selected from various processes using a fixed bed, a moving bed, an ebullient bed or a suspensoid bed. Preferred is a fixed bed process. The mode of passing the feed oil through the bed may be any of down-flow and up-flow.

Regarding the reaction condition for the fixed bed process, except the temperature and the pressure, the liquid hourly space velocity (LHSV) falls generally between 0.05 and 10 $hr^{-1}$, preferably between 0.1 and 5 $hr^{-1}$, and the ratio of hydrogen/crude oil falls generally between 150 and 2,500 $Nm^3/kl$, preferably between 200 and 2,000 $Nm^3/kl$.

The hydrocarbon oil to be processed herein may be any and every petroleum fraction. Concretely, it broadly includes kerosene, light gas oil, heavy gas oil, cracked gas oil, as well as atmospheric residue, vacuum residue, dewaxed vacuum residue, asphaltene oil, and tar sand oil. The invention is especially effective for reducing the sulfur content of gas oil to 50 ppm or less.

Still another aspect of the invention is a method for producing a hydrogenation catalyst, which comprises applying a water-soluble organic compound having a boiling point or a decomposition point of not lower than 150° C. to a refractory inorganic oxide carrier, then applying thereto a metal compound of Group 4 of the Periodic Table, and thereafter further applying thereto at least one metal compound of Group 6 and at least one metal compound of Groups 8 to 10 of the Periodic Table, optionally along with a phosphorus compound.

The refractory inorganic oxide carrier for use in the invention includes alumina, silica, silica-alumina, magnesia, zirconia, titania, zinc oxide, crystalline aluminosilicates, clay minerals and their mixtures. Above all, preferred is alumina. Preferably, the mean pore diameter of the carrier falls between 70 and 150 angstroms, more preferably between 80 and 140 angstroms. Regarding its morphology, the carrier may be powdery, or may be shaped to have, for example, a columnar, three-leaved or four-leaved pellet.

First, a water-soluble organic compound having a boiling point or a decomposition point of not lower than 150° C. (this will be hereinafter referred to as "water-soluble organic compound") is applied to the refractory inorganic oxide carrier. If the boiling point or the decomposition point of the compound is lower than 150° C., it is unfavorable since the compound will evaporate or decompose to lose its effect while the catalyst is produced. If the compound is not soluble in water, it is also unfavorable since the compound is ineffective.

The water-soluble organic compound may be, for example, one having a molecular weight of at least 100 and having a hydroxyl group and/or an ether bond. Concretely, it includes water-soluble alcohols having a boiling point of not lower than 150° C., such as 1,3-butanediol, 1,4-butanediol, butanetriol, 1,2-propanediol, 1,2-pentanediol; iso-alcohols having at least 4 carbon atoms, such as 5-methyl-1-hexanol, isoamyl alcohol (3-methyl-1-butanol), s-isoamyl alcohol (3-methyl-2-butanol), isoundecylene alcohol, isooctanol, isopentanol, isogeranol, isohexyl alcohol, 2,4-dimethyl-1-pentanol, 2,4,4-trimethyl-1-pentanol; alcohols having at least 5 carbon atoms and having a hydroxyl group bonded to the carbon except the terminal carbon, such as 2-hexanol, 3-hexanol; ether group-containing water-soluble compounds such as polyethylene glycol, triethylene glycol, diethylene glycol, polyoxyethylene phenyl ether, polyoxyethylene octylphenyl ether; water-soluble polymers such as polyvinyl alcohol; saccharides such as saccharose, glucose; water-soluble polysaccharides such as methyl cellulose, water-soluble starch; and their derivatives. One or more of these compounds may be applied to the carrier, either singly or as combined.

The carrier thus carries such a water-soluble organic compound applied thereto. Accordingly, when a metal compound of Group 4 of the Periodic Table is applied to the carrier in the next step, the reaction between the metal and the carrier is retarded, and, as a result, the metal compound of Group 4 of the Periodic Table applied to the carrier is highly dispersed in the carrier. Finally, therefore, the active metals applied to the carrier in the last step are well held on the metal oxide of Group 4 of the Periodic Table highly dispersed in the carrier, and the catalyst exhibits high desulfurization activity.

The amount of the water-soluble organic compound to be impregnated preferably falls between 3 and 15% by weight, more preferably between 5 and 10% by weight of the carrier. If the amount of the water-soluble organic compound is too small, the compound will be ineffective; but even if the amount is larger than the defined range, the effect of the compound will be no more augmented and using too much of the compound will be uneconomical.

For applying the water-soluble organic compound to the carrier, the carrier may be soaked with an aqueous impregnation solution of the compound. For this, employable is an ordinary impregnation method or a pore-filling method, and impregnating the carrier with the solution may be effected under atmospheric pressure or under reduced pressure.

After the carrier has been soaked with an aqueous impregnation solution of the water-soluble organic compound, it is dried under atmospheric pressure or under reduced pressure, preferably at a temperature falling between 50 and 150° C., more preferably between 100 and 130° C., for from 0.3 to 100 hours.

Next, a metal compound of Group 4 of the Periodic Table is applied to the carrier. This is for more highly dispersing the active metals applied to the carrier in the next step. The metal of Group 4 is preferably titanium or zirconium.

The metal compound includes, for example, alkoxides such as titanium isopropylate, titanium ethoxide, titanium-2-ethyl-1-hexanolate, ethylacetoacetate-titanium, tetra-n-butoxy-titanium, tetramethoxy-titanium, zirconium acetylacetonate, acetylacetone-tributoxy-zirconium, zirconium butoxide; and also titanium sulfate, titanium tetrachloride, titanium hydroxide, zirconium sulfate, zirconium chloride, zirconium oxychloride, zirconium oxysulfate, zirconium hydroxide, zirconium sulfate, zirconium nitrate, zirconium acetate, and zirconium ammonium carbonate. Preferred are alkoxides, sulfates and chlorides.

The amount of the metal compound of Group 4 of the Periodic Table to be carried by the carrier may fall, in terms of its oxide, between 0.5 and 30% by weight, preferably between 1 and 20% by weight, more preferably between 1 and 15% by weight of the catalyst. If its amount is too small, the metal compound will be ineffective; but if too large, the viscosity of the aqueous impregnation solution increases too much, and the compound could not penetrate into the depths of the carrier and will be ineffective.

For applying the metal compound of Group 4 of the Periodic Table to the carrier, for example, the alkoxides are dissolved in an alcohol to be alcoholic solutions and the others are in water to be aqueous solutions. The carrier is soaked with the solution in an ordinary impregnation method or in a pore-filling method, under atmospheric or reduced pressure.

The alcohol includes, for example, propanol, butanol, ethanol and methanol.

When the carrier is soaked with an impregnation solution of the metal compound of Group 4 of the Periodic Table, a stabilizer is added to the impregnation solution. This is effective for preventing the metal compound from being hydrolyzed or from agglomerating.

The stabilizer includes amines such as monoethanolamine, diethanolamine, triethanolamine; alcohols such as butanediol, butanetriol, propanediol, 5-methyl-1-hexanol, isoamyl alcohol (3-methyl-1-butanol), s-isoamyl alcohol (3-methyl-2-butanol), isoundecylene alcohol, isooctanol, isopentanol, isogeranol, isohexyl alcohol, 2,4-dimethyl-pentanol, 2,4,4-trimethyl-1-pentanol; and acids such as hydrochloric acid, sulfuric acid, acetic acid, citric acid, malic acid. Its amount may fall generally between 0.1 and 10 mols, relative to one mol of the metal compound of Group 4 of the Periodic Table.

After having been soaked with an impregnation solution of the metal compound of Group 4 of the Periodic Table, the carrier is dried under atmospheric or reduced pressure, preferably at a temperature falling between 50 and 600° C., more preferably between 100 and 550° C., for from 0.5 to 100 hours.

Next, the carrier is calcined, preferably at a temperature falling between 50 and 750° C., more preferably between 100 and 650° C., for from 0.5 to 100 hours.

Washing the carrier is effective for removing sulfate and chlorine from it.

Finally, at least one metal compound of Group 6 and at least one metal compound of Groups 8 to 10 of the Periodic Table, and optionally a phosphorus compound are applied to the carrier.

The metal of Group 6 of the Periodic Table is preferably molybdenum or tungsten, more preferably molybdenum. The molybdenum compound includes, for example, molybdenum trioxide, and ammonium para-molybdate. The tungsten compound includes, for example, tungsten trioxide, and ammonium tungstate. The amount of the metal to be loaded on the carrier preferably falls, in terms of its oxide, between 4 and 40% by weight, more preferably between 8 and 35% by weight, even more preferably between 8 and 30% by weight of the catalyst.

The metal of Groups 8 to 10 of the Periodic Table is generally cobalt or nickel. The nickel compound for use herein includes, for example, nickel nitrate and basic nickel carbonate; and the cobalt compound includes, for example, cobalt nitrate and basic cobalt carbonate. The amount of the metal to be loaded on the carrier preferably falls, in terms of its oxide, between 1 and 12% by weight, more preferably between 2 and 10% by weight of the catalyst.

The phosphorus compound for use herein includes, for example, phosphorus pentoxide and ortho-phosphoric acid. The amount of the compound to be carried by the carrier preferably falls, in terms of its oxide, between 0.5 and 8% by weight, more preferably between 1 and 6% by weight of the catalyst.

For applying the active metal compounds to the carrier, preferred is an impregnation method. The carrier may be soaked by sequential impregnation with different solutions of the three groups of the metal compound of Group 6 of the Periodic Table, the metal compound of Groups 8 to 10 of the Periodic Table, and the phosphorus compound, but is preferably soaked by co-impregnation with one solution containing all the compounds. In general, the metal compounds are dissolved in pure water, and the resulting aqueous solution is so controlled that its amount is comparable to the water absorption of the carrier. With that, the carrier is soaked with the impregnation solution. When the impregnation is acidic, its pH generally falls between 1 and 4, preferably between 1.5 and 3.5, in consideration of the stability of the impregnation solution. When the solution is alkaline, its pH generally falls between 9 and 12, preferably between 10 and 11. The method of pH control of the solution is not specifically defined. In general, an inorganic acid such as nitric acid, hydrochloric acid or sulfuric acid, or an organic acid such as malic acid, citric acid or ethylenediamine-tetraacetic acid, or ammonia is added to the solution.

While the active metals are applied to the carrier, the above-mentioned water-soluble organic compound may also be applied thereto along with the active metal compounds.

After having been thus dipped, the carrier is calcined, preferably at a temperature falling between 50 and 400° C., more preferably between 100 and 300° C., even more preferably between 120 and 250° C., for from 0.5 to 100 hours. If the temperature for calcination is too low, the metal components could not satisfactorily bond to the carrier; but if too high, the metal components will readily agglomerate.

The hydrogenation catalyst produced according to the method of this aspect of the invention is favorable for desulfurization.

Still another aspect of the invention relating to catalyst production is a method for producing a hydrogenation catalyst, which comprises applying a metal compound of Group 4 of the Periodic Table to a refractory inorganic oxide carrier, along with a water-soluble organic compound having a boiling point or a decomposition point of not lower than 150° C. thereto, and thereafter further applying thereto at least one metal compound of Group 6 and at least one metal compound of Groups 8 to 10 of the Periodic Table, optionally along with a phosphorus compound.

The condition for impregnating the carrier with the impregantion solutions in this aspect is the same as that in the above-mentioned aspect of the invention (the method for producing a hydrogenation catalyst, which comprises applying a water-soluble organic compound having a boiling point or a decomposition point of not lower than 150° C. to a refractory inorganic oxide carrier, then applying thereto a metal compound of Group 4 of the Periodic Table, and thereafter further applying thereto at least one metal compound of Group 6 and at least one metal compound of Groups 8 to 10 of the Periodic Table, and optionally a phosphorus compound). In this aspect, the condition for drying and calcining the carrier having been soaked with a impregnation solution containing a water-soluble organic compound and a metal compound of Group 4 of the Periodic Table is the same as that in the above-mentioned aspect of the invention where the carrier is dried and calcined after having been soaked with a solution of a metal compound of Group 4 of the Periodic Table. Concretely, the carrier is dried under atmospheric or reduced pressure, preferably at a temperature falling between 50 and 600° C., more preferably between 100 and 550° C., for from 0.5 to 100 hours.

After thus dried, the carrier is calcined preferably at a temperature falling between 50 and 750° C., more preferably between 100 and 650° C., for from 0.5 to 100 hours.

The condition for calcining the carrier after having been finally soaked with a impregnation solution of active metal compounds is the same as that in the above-mentioned aspect of the invention. Concretely, the carrier is calcined preferably at a temperature falling between 50 and 400° C., more preferably between 100 and 300° C., even more preferably between 120 and 250° C., for from 0.5 to 100 hours. While the active metals are applied to the carrier, the above-mentioned water-soluble compound may also be applied thereto along with the active metals. The hydrogenation catalyst produced according to the method of this aspect is favorable for denitrogenation.

Still another aspect of the invention relating to catalyst production is a method for producing a hydrogenation catalyst, which comprises applying at least one metal compound of Group 6 and at least one metal compound of Groups 8 to 10 of the Periodic Table to a refractory inorganic oxide carrier, and optionally a phosphorus compound, along with a water-soluble organic compound having a boiling point or a decomposition point of not lower than 150° C. thereto, and thereafter further applying thereto a metal compound of Group 4 of the Periodic Table.

The condition for impregnating the carrier with the impregnation solutions in this aspect is the same as that in the above-mentioned aspects of the invention. However, the condition for drying and calcining the carrier in this aspect differs from that in the other aspects. Concretely, in this aspect, after the carrier has been soaked with the impregnation solution containing a water-soluble organic compound and active metal compounds, it is simply dried, preferably at a temperature falling between 50 and 150° C., preferably between 100 and 130° C., for from 0.5 to 100 hours. After the carrier has been soaked with the impregnation solution of a metal compound of Group 4 of the Periodic Table in the last step of this aspect, it is calcined under the same condition as that in the process of the other aspects where the carrier soaked with a solution of active metal compounds is calcined. Concretely, the carrier is finally calcined, preferably at a temperature falling between 50 and 400° C., more preferably between 100 and 300° C., even more preferably between 120 and 250° C., for from 0.5 to 100 hours. The hydrogenation catalyst produced according to the method of this aspect is favorable for dearomatization. The mean pore size of the catalysts produced in the above-mentioned three aspects of the invention falls generally between 50 and 150 angstroms, preferably between 80 and 120 angstroms; and the specific surface area thereof falls generally between 140 and 400 m²/g, preferably between 160 and 350 m²/g. The total pore volume of each catalyst falls generally between 0.2 and 1.0 cc/g, preferably between 0.25 and 0.8 cc/g.

Prior to being used for hydrogenation, it is desirable that the catalyst is pre-sulfurized for stabilizing it. The condition for pre-sulfurization is not specifically defined. In general, hydrogen sulfide, carbon disulfide, thiophene or dimethyl disulfide is used as a pre-sulfurizing agent. The temperature for the treatment may fall between 200 and 400° C.; and the pressure may fall between atmospheric pressure and 30 MPa.

The condition for hydrogenation varies, depending on the type of the oil to be processed and on the use of the processed oil. In general, the reaction temperature falls between 200 and 550° C., preferably between 220 and 500° C.; and the hydrogen partial pressure falls between 1 and 30 MPa, preferably between 2 and 25 MPa.

The reaction mode is not specifically defined. In general, it maybe selected from various processes using a fixed bed, a moving bed, an ebullient bed or a suspensoid bed. Preferred is a fixed bed process. The mode of passing the feed oil through the bed may be any of down-flow and up-flow.

Regarding the reaction condition for the fixed bed process, except the temperature and the pressure, the liquid hourly space velocity (LHSV) falls generally between 0.05 and 10 hr$^{-1}$, preferably between 0.1 and 5 hr$^{-1}$, and the ratio of hydrogen/feed oil falls generally between 150 and 2,500 Nm³/kl, preferably between 200 and 2,000 Nm³/kl.

The hydrocarbon oil to be processed herein may be any and every petroleum fraction. Concretely, it broadly includes kerosene, light gas oil, heavy gas oil, cracked gas oil, as well as atmospheric residue, vacuum residue, dewaxed vacuum residue, asphaltene oil, and tar sand oil.

The metal compound-loading refractory inorganic oxide carrier (this will be hereinafter referred to as "carrier") of the invention is produced by impregnating a refractory inorganic oxide carrier with a metal compound and therefore carries the metal of the metal compound. In the carrier, the metal exists uniformly everywhere inside it. The specific condition of the carrier can be identified by various methods of analyzing the carrier. In the present invention, this is analyzed through EPMA of the carrier.

Figure 2:
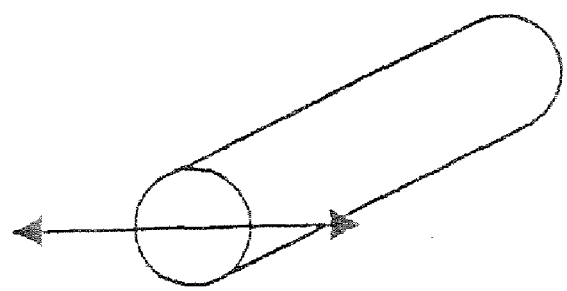
FIG. 2 is a perspective view showing one example of the metal compound-loading refractory inorganic oxide carrier of the invention used in EPMA. In this, the arrow indicates the direction for linear analysis of the metal atom in the carrier.

FIG. 1 is a graph showing the metal content distribution in the metal compound-loading refractory inorganic oxide carrier of the invention, and this indicates the data of linear analysis obtained through EPMA of the metal atom in one example of the carrier of the invention. The graph shows the relationship between the length, t, of the cross section in the cross direction of the carrier and the X-ray intensity, I. FIG. 2 is a perspective view showing one example of the metal compound-loading refractory inorganic oxide carrier of the invention used in EPMA. In this, the arrow indicates the direction for linear analysis of the metal atom in the carrier.

The invention is described in more detail with reference to FIG. 1 and FIG. 2. Herein referred to is one columnar example of the metal compound-loading refractory inorganic oxide carrier of the invention, as in FIG. 2. The columnar carrier is subjected to linear analysis through EPMA in the direction of the line on the cross section of the carrier that is parallel to the bottom surface thereof, as illustrated. The graph of FIG. 1 shows the data of the linear analysis, in which the horizontal axis indicates the length, t, of the cross section in the cross direction of the carrier (that is, "t" is the distance from one surface of the carrier), and the vertical axis indicates the X-ray intensity, I (that is, "I" means the metal atom concentration in the carrier), and the graph shows the relationship between "t" and "I". The carrier of the invention satisfies the ratio, x=Fm/F, of being at least 0.5, in which "F" indicates the integral value of the X-ray intensity I(t) with t being the distance between one surface of the carrier (t=0) and the other surface thereof (t=t$_0$), and Fm indicates the integral value of the X-ray intensity Im(t) on the line tangential to the X-ray intensity curve at the minimum and smallest point of the curve, with t being also the same distance as above, between (t=0) and (t=t$_0$). If the ratio, x, is smaller than 0.5, the condition of the metal compound carried by the carrier is not uniform, and the carrier thus carrying the metal compound in such a non-uniform condition could not exhibit high desulfurization activity. From this viewpoint, in the invention, the ratio, x, of the carrier of the invention must be at least 0.5. The linear analysis herein mentioned can apply to any carrier of any shape, and every carrier having the specifically defined ratio, x, exhibits the specific effect of the invention.

Next described is a method for producing the metal compound-loading refractory inorganic oxide carrier of the invention. The carrier of the invention is produced by dipping a refractory inorganic oxide carrier in an aqueous solution that contains a water-soluble organic compound having a boiling point or a decomposition point of not lower than 150° C., then drying it, and thereafter further impregnating with a solution of a metal compound.

The refractory inorganic oxide carrier for use herein includes alumina, silica, silica-alumina, magnesia, zirconia, titania, zinc oxide, crystalline aluminosilicates, clay minerals and their mixtures. Above all, preferred is γ-alumina. For use for hydrocracking of hydrocarbons, preferred is a mixture of γ-alumina and crystalline aluminosilicate.

The metal of the metal compound is preferably of Group 4 of the Periodic Table, more preferably titanium or zirconium.

Concretely, the metal compound includes titanium sulfate, titanium chloride, titanium peroxide, titanium oxalate, titanium acetate, zirconium oxychloride, zirconium sulfate, zirconium nitrate, zirconium acetate, zirconium ammonium carbonate.

Also preferred are metal alkoxides. Concretely, they include tetra-n-isopropoxy-titanium, ethylacetoacetate-titanium, tetra-n-butoxy-titanium, tetramethoxy-titanium, triisopropoxy-aluminium, tri-s-butoxy-aluminium, mono-s-butoxy-diisopropoxy-aluminium, and acetylacetone-tributoxy-zirconium.

For the titanium compound for titanium to be impregnated, especially preferred is a titanium-peroxohydroxycarboxylic acid or its ammonium salt, as it facilitates the introduction of titanium into the carrier. The hydroxycarboxylic acid includes citric acid, malic acid, lactic acid and tartaric acid. The amount of the metal compound to be carried by the refractory inorganic oxide carrier preferably falls, in terms of its oxide, between 1 and 30% by weight, more preferably between 2 and 15% by weight of the carrier. If its amount is too small, the metal could not satisfactorily exhibit its effect; but if too large, the excess metal will agglomerate and could not disperse in good condition.

The water-soluble organic compound having a boiling point or a decomposition point of not lower than 150° C. (this will be hereinafter referred to as "water-soluble organic compound"), which is applied to the refractory inorganic oxide carrier, includes, for example, diols such as 1,3-butanediol, 1,4-butanediol, butanetriol, 1,2-propanediol, 1,2-pentanediol; iso-alcohols having at least 4 carbon atoms, such as 5-methyl-1-hexanol, isoamyl alcohol (3-methyl-1-butanol), s-isoamyl alcohol (3-methyl-2-butanol), isoundecylene alcohol, isooctanol, isopentanol, isogeranol, isohexyl alcohol, 2,4-dimethyl-1-pentanol, 2,4,4-trimethyl-1-pentanol; alcohols having at least 5 carbon atoms and having a hydroxyl group bonded to the carbon except the terminal carbon, such as 2-hexanol, 3-hexanol; ether group-containing water-soluble polymers such as polyethylene glycol, polyoxyethylene phenyl ether, polyoxyethylene octylphenyl ether; water-soluble polymers such as polyvinyl alcohol; saccharides such as saccharose, glucose; water-soluble polysaccharides such as methyl cellulose, water-soluble starch; and their derivatives. One or more of these compounds may be applied to the carrier, either singly or as combined.

The amount of the water-soluble organic compound to be added to the carrier preferably falls between 2 and 20% by weight, more preferably between 3 and 15% by weight of the carrier. The impregnation solution of the compound is so controlled that its amount is comparable to the water absorption of the carrier, by controlling the amount of water in which the compound is dissolved to prepare its solution.

If the amount of the aqueous solution of the water-soluble organic compound is too small, the effect of the invention could not be attained; but if too large, the viscosity of the aqueous solution increases too much, and the compound could not penetrate into the depths of the carrier and will be ineffective.

The carrier may be soaked with the aqueous impregnation solution of the water-soluble organic compound according to a pore-filling method, either under atmospheric pressure or under reduced pressure.

After the carrier has been soaked with the aqueous solution of the water-soluble organic compound, it is dried at around 120° C. or so until it contains no water, and thereafter the thus-dried carrier is again soaked with a impregnation solution of the metal compound. In general, the carrier may be soaked with the metal compound solution according to a pore-filling method, or may be soaked with a large excess amount of the solution. To prepare the solution of the metal compound, usable is any of water, alcohols, hexane and heptane. A metal oxide, a type of the metal compound, may be dissolved in an alcohol, such as propanol, butanol, ethanol or methanol.

When the metal compound is such a metal alkoxide, it is desirable to add an amine or any other alcohol to the alcohol solution of the metal alkoxide for stabilizing the metal alkoxide. The amount of the amine or the other alcohol to be added preferably falls, in terms of the molar ratio to the metal alkoxide, between 0.3 and 2.5, more preferably between 0.6 and 1.5. The amine includes, for example, monoethanolamine, diethanolamine, and triethanolamine. The additional alcohol may be 1,3-butanediol.

After the carrier has been soaked with the metal compound solution, it may be dried in vacuum or under atmospheric pressure, at a temperature falling between 50 and 130° C. After having been thus fully dried, the carrier is preferably calcined at a temperature falling between 300 and 800° C., more preferably between 400 and 600° C., for stabilizing the metal in the carrier. However, the calcining step may be omitted.

The metal compound-loading refractory inorganic oxide carrier thus produced in the manner mentioned above may be further processed in the manner to be mentioned below so that it carries active metals, at least one metal of Group 6 and at least one metal of Groups 8 to 10 of the Periodic Table, and it is used as a catalyst for hydrogenation, especially a catalyst for hydro-desulfurization. The metal of Group 6 of the Periodic Table includes molybdenum and tungsten, and molybdenum is preferred. The amount of the metal to be carried by the carrier falls, in terms of its oxide, between 4 and 40% by weight, preferably between 8 and 35% by weight, more preferably between 8 and 30% by weight of the catalyst. For the metal of Groups 8 to 10 of the Periodic Table, generally used is cobalt or nickel. Its amount to be carried by the carrier falls, in terms of its oxide, between 1 and 12% by weight, preferably between 2 and 10% by weight of the catalyst. If desired, phosphorus may be added to the carrier. The amount of the phosphorus to be loaded on the carrier falls, in terms its oxide, between 0 and 8% by weight, preferably between 1 and 6% by weight of the catalyst.

For applying the metals to the carrier, preferred is a dipping method. The molybdenum compound of Group 6 of the Periodic Table includes, for example, molybdenum trioxide, and ammonium para-molybdate; and the tungsten compound includes, for example, tungsten trioxide and ammonium tungstate. The nickel compound of the Groups 8 to 10 of the Periodic Table includes, for example, nickel nitrate and basic nickel carbonate; and the cobalt compound includes, for example, cobalt nitrate and basic cobalt carbonate. If desired, phosphorus may be added to the carrier. The phosphorus compound usable for this includes, for example, phosphorus pentoxide and phosphoric acid. The metal compounds are dissolved in pure water in such a ratio that the metal of Group 6 of the Periodic Table is from 0.7 to 7.0 mols/liter, the metal of Groups 8 to 10 of the Periodic Table is from 0.3 to 3.6 mols/liter, and the phosphorus compound is from 0 to 2.2 mols/liter, and the amount of the resulting solution is so controlled that it is equivalent to the water absorption of the carrier. With that, the carrier is soaked with the solution. When the solution in which the carrier is dipped is acidic, its pH generally falls between 1 and 4, preferably between 1.5 and 3.5, in consideration of the stability of the impregnation solution. When the solution is alkaline, its pH generally falls between 9 and 12, preferably between 10 and 11. The method of pH control of the solution is not specifically defined. In general, an inorganic acid such as nitric acid, hydrochloric acid or sulfuric acid, or an organic acid such as malic acid, citric acid or ethylenediamine-tetraacetic acid, or ammonia is added to the solution. After having been thus prepared by impregnation method, the resulting catalyst is heated, preferably at a temperature falling between 80 and 600° C., more preferably between 120 and 300° C. If the temperature for heat treatment is too high, the metal components will agglomerate and will fail to be sufficiently active; but if too low, the metal components could not fully bond to the carrier and will fail to be sufficiently active. The heat treatment is effected in air.

The mean pore diameter of the catalyst thus obtained fall between 50 and 150 angstroms, preferably between 80 and 120 angstroms; and the specific surface area thereof falls between 140 and 400 $m^2/g$, preferably between 160 and 350 $m^2/g$. The total pore volume of the catalyst falls between 0.2 and 1.0 cc/g, preferably between 0.25 and 0.8 cc/g.

The mean pore diameter and the total pore volume are measured according to a method of mercury penetration; and the specific surface area is measured according to a method of nitrogen adsorption.

Still another aspect of the invention is a method of using the catalyst for hydro-desulfurization of hydrocarbon oil. This is for desulfurization, but may be for denitrogenation and hydro-cracking.

Prior to being used for hydro-desulfurization, it is desirable that the catalyst is pre-sulfurized for stabilizing it. The condition for pre-sulfurization is not specifically defined. In general, hydrogen sulfide, carbon disulfide, thiophene or dimethyl disulfide is used as a pre-sulfurizing agent. The temperature for the treatment may fall between 200 and 400° C.; and the pressure may fall between atmospheric pressure and 30 MPa.

The condition for hydro-desulfurization varies, depending on the type of the oil to be processed and on the use of the processed oil. In general, the reaction temperature falls between 200 and 550° C., preferably between 220 and 500° C.; and the hydrogen partial pressure falls between 1 and 30 MPa, preferably between 2 and 25 MPa.

The reaction mode is not specifically defined. In general, it maybe selected from various processes using a fixed bed, a moving bed, an ebullient bed or a suspensoid bed. Preferred is a fixed bed process. The mode of passing the feed oil through the bed may be any of down-flow and up-flow.

Regarding the reaction condition for the fixed bed process, except the temperature and the pressure, the liquid hourly space velocity (LHSV) falls generally between 0.05 and 10 hr$^{-1}$, preferably between 0.1 and 5 hr$^{-1}$, and the ratio of hydrogen/feed oil falls generally between 150 and 2,500 Nm$^3$/kl, preferably between 200 and 2,000 Nm$^3$/kl.

The hydrocarbon oil to be processed herein may be any and every petroleum fraction. Concretely, it broadly includes kerosene, light gas oil, heavy gas oil, cracked gas oil, as well as atmospheric residue, vacuum residue, dewaxed vacuum residue, asphaltene oil, and tar sand oil.

In the invention, the metal-loading on a refractory inorganic oxide carrier exists uniformly everywhere inside the carrier. When active metals are applied to the carrier, they interact with the metal inside the carrier, and therefore their catalytic activity is higher than that of active metals held on the surface of a refractory inorganic oxide. In addition, it is believed that those of active metals having a higher activity are selectively supported on the metal inside the carrier, and therefore further enhance their catalytic activity.

The invention is described more concretely with reference to the following Examples, which, however, are not intended to restrict the scope of the invention.

EXAMPLE 1

100 g of a γ-alumina carrier (A1) having a water absorption of 0.8 cc/g was soaked with 52.9 g of an aqueous 30 wt. % titanium sulfate solution (this was previously diluted with pure water to be comparable to the water absorption of the carrier) under atmospheric pressure, then dried in vacuum at 70° C. for 1 hour and thereafter in a drier at 120° C. for 3 hours, and calcined at 500° C. for 4 hours to prepare a carrier (B1).

The amount of the sulfate (SO$_4^{2-}$) remaining in the carrier was measured with LECO (high-frequency combustion IR detector), and it was not smaller than 5% by weight of the carrier. Therefore, the carrier B1 was put into a 2-liter beaker, to which was added one liter of pure water. This was stirred with a stirring blade to wash it, and poured along with the pure water onto a sieve, of which the mesh size is smaller than the size of the carrier particles. This operation was repeated three times, and the amount of the sulfate remaining in the carrier was reduced to 2% by weight. Next, this was dried at 120° C. for 5 hours to remove water.

Next, 69.5 g of nickel carbonate (corresponding to 39.7 g of NiO), 220 g of molybdenum trioxide, and 31.5 g of orthophosphoric acid (purity: 85%, corresponding to 19.5 g of P$_2$O$_5$) were added to 250 cc of pure water, and dissolved therein with stirring at 80° C. Then, this was cooled to room temperature, and pure water was added thereto to make 250 cc in total. This is a impregnation solution (S1).

50 cc of the impregnation solution (S1) was metered, to which was added 6 g of polyethylene glycol (molecular weight: 400). Then, this was diluted with pure water to be comparable to the water absorption of the carrier (B1). 100 g of the carrier (B1) was soaked with the thus-diluted impregnation solution (S1) under atmospheric pressure, then dried in vacuum at 70° C. for 1 hour, and thereafter heated at 120° C. for 16 hours. This is catalyst 1. Its composition and physical properties are shown in Table 1.

EXAMPLE 2

500 g of titanium tetrachloride and one liter of pure water were kept cooled with ice. With the pure water being stirred, the titanium tetrachloride was gradually dropwise added thereto while it was still cooled. This greatly generated heat and produced white smoke, and then gave colorless titania sol. 1.2 times equivalent, to the titania sol, of aqueous ammonia (concentration: 1 mol/liter) was dropwise added to the titania sol, and stirred for 1 hour, and titanium hydroxide gel was thus formed. The gel was taken out through filtration under suction, and again dispersed in about 1 liter of pure water, and washed through filtration. This operation was repeated 4 times until the wash waste became neutral, whereby the chloride was removed from the gel.

The water content of the thus-obtained titanium hydroxide gel was measured, and 11 g, in terms of titania, of the gel was metered. 50 cc of aqueous 25 wt. % ammonia was added thereto, and stirred for 30 minutes. Then, 38 cc of aqueous 30 wt. % hydrogen peroxide was gradually added thereto to give an yellow titanium-peroxotitanium solution. 29 g of citric acid was gradually added to this, and then gradually heated up to 50° C. with stirring to remove the excess hydrogen peroxide. This was further heated up to 80° C., at which a complex was formed and completely dissolved. Next, this was concentrated to be 117 cc of an orange transparent solution. This is ammonium titanium-peroxocitrate (T1).

100 g of a γ-alumina carrier (A1) having a water absorption of 0.8 cc/g was soaked with 60 cc of the aqueous solution of T1 (this was previously diluted with pure water to be comparable to the water absorption of the carrier) under atmospheric pressure, then dried in vacuum at 70° C. for 1 hour and thereafter in a drier at 120° C. for 3 hours, and calcined at 500° C. for 4 hours to prepare a carrier (B2).

Next, 50 cc of the impregnation solution (S1) that had been prepared in Example 1 was metered, to which was added 6 g of polyethylene glycol (molecular weight: 400). Then, this was diluted with pure water to be comparable to the water absorption of the carrier (B2). 100 g of the carrier (B2) was soaked with the thus-diluted impregnation solution (S1) under atmospheric pressure, then dried in vacuum at 70° C. for 1 hour, and thereafter heated at 120° C. for 16 hours. This is catalyst 2. Its composition and physical properties are shown in Table 1.

EXAMPLE 3

The carrier (B2) was prepared in the same manner as in Example 2. 50 cc of the impregnation solution (S1) was metered, to which was added 6 g of polyethylene glycol (molecular weight: 400). Then, this was diluted with pure water to be comparable to the water absorption of the carrier (B2). 100 g of the carrier (B2) was soaked with the thus-diluted impregnation solution (S1) under atmospheric pressure, then dried in vacuum at 70° C. for 1 hour, and thereafter heated at 120° C. for 3 hours and then at 500° C. for 3 hours. This is catalyst 3. Its composition and physical properties are shown in Table 1.

COMPARATIVE EXAMPLE 1

50 cc of the impregnation solution (S1) that had been prepared in Example 1 was metered, to which was added 6 g of polyethylene glycol (molecular weight: 400). Then, this was diluted with pure water to be comparable to the water absorption of a γ-alumina carrier (A1) having a water absorption of 0.8 cc/g. 100 g of the carrier (A1) was soaked with the thus-diluted impregnation solution (S1) under atmospheric pressure, then dried in vacuum at 70° C. for 1 hour, and thereafter heated at 120° C. for 16 hours. This is catalyst 4. Its composition and physical properties are shown in Table 1.

COMPARATIVE EXAMPLE 2

The active metals were applied to the carrier in the same manner as in Example 1. Then, this was dried in vacuum at 70° C. for 1 hour, and thereafter heated at 120° C. for 3 hours and then 500° C. for 3 hours. This is catalyst 5. Its composition and physical properties are shown in Table 1.

COMPARATIVE EXAMPLE 3

15 liters of pure water at 60° C. was put into a hot stirrer, to which were added sodium aluminate and sodium hydroxide to make an $Al_2O_3$ concentration of 8.0% by weight and an NaOH concentration of 3.5% by weight, respectively. Then, this was heated at 60° C. to be a solution A. On the other hand, 15 liters of pure water was put into another hot stirrer, to which were added an aqueous titanium sulfate solution and an aqueous aluminium sulfate solution to make a $TiO_2$ concentration of 0.6% by weight and an $Al_2O_3$ concentration of 3.0% by weight, respectively. This was heated at 60° C. to be a solution B. The solution B was added to the solution A, and its pH was made 7 to produce a gel of titania-alumina co-precipitate hydrate. This was aged at 60° C. for 1 hour. Next, this was washed on a filter with 70 times the gel of aqueous 0.3 wt. % ammonia added thereto. Pure water was added to the resulting residue to thereby make the residue have a solid content of 12% by weight. With aqueous ammonia added thereto, the pH of the residue was made 11, and this was aged in a hot stirrer at 90° C. for 13 hours. Next, this was again filtered, then washed with 10 times the residue of pure water, and thereafter dried at 80° C. while stirred. This was shaped into 1.58 mm columnar pellets through an extruder, then dried at 120° C. for 15 hours, and thereafter calcined at 500° C. for 4 hours. This is titania-alumina carrier (B3).

Next, 50 cc of the impregnation solution (S1) that had been prepared in Example 1 was metered, to which was added 6 g of polyethylene glycol (molecular weight). Then, this was diluted with pure water to be comparable to the water absorption of the titania-alumina carrier (B3) having a water absorption of 0.7 cc/g. 100 g of the carrier (B3) was soaked with the thus-diluted impregnation solution (S1) under atmospheric pressure, then dried in vacuum at 70° C. for 1 hour, and thereafter heated at 120° C. for 16 hours. This is catalyst 6. Its composition and physical properties are shown in Table 1.

Hydrogenation of Gas Oil Fraction 100 cc of any of catalysts 1 to 5 was filled into the reactor tube of a fixed bed flow system. Along with hydrogen gas, feed oil was introduced into the reactor tube from its bottom to thereby make it flow upward in the system in a mode of up-flow, and its reactivity with the catalyst was evaluated. Prior to this, feed oil (straight-run light gas oil (LGO) from the Middle East), of which the properties are shown in Table 2, was pre-treated with dimethyl disulfide added thereto, thereby having a sulfur content of 2.5% by weight. Along with hydrogen gas, the pre-treated crude oil was introduced into the system at 290° C. for 24 hours, to thereby pre-sulfurize the catalyst. After the catalyst was thus pre-sulfurized, crude oil (straight-run light gas oil (LGO) from the Middle East) of the same type as above was, along with hydrogen gas, introduced into the reactor tube, and hydrogenated. The reaction temperature was from 330 to 360° C.; the hydrogen partial pressure was 5 MPa; the ratio of hydrogen/crude oil was 250 $Nm^3$/kl; and LHSV was 1.5 $hr^{-1}$. The data measured at 330 to 360° C. were used to obtain the average desulfurization rate constant of each catalyst. Based on this, the relative desulfurization activity of each catalyst was obtained, relative to the desulfurization activity based on the averaged desulfurization rate constant of the catalyst of Comparative Example 1 (catalyst 4) of being 100, and shown in Table 3.

EXAMPLE 4

Method 1 of Applying Active Metals to Carrier 90 g of a γ-alumina carrier (A1) having a water absorption of 0.8 cc/g was dipped in 10 g of 1,3-butanediol (boiling point: 204° C.) having been diluted with pure water to be 80 cc, and dried at 120° C. for 16 hours to prepare a carrier (B1).

100 g of the carrier (B1) was soaked with a solution of 47.5 g of an aqueous 30 wt. % titanium sulfate and 0.5 g of sulfuric acid, which had been diluted with pure water to be comparable to the water absorption of the carrier (B1), under atmospheric pressure, then dried at 120° C. for 16 hours, and thereafter calcined at 500° C. for 4 hours. The carrier was washed in one liter of pure water with stirring, and then dried at 120° C. to prepare a carrier (B2).

Next, 45.6 g of nickel carbonate, 97.5 g of molybdenum trioxide, and 42.2 g of ortho-phosphoric acid were added to 250 cc of pure water, and dissolved therein with stirring at 80° C. Then, this was cooled to room temperature, and pure water was added thereto to make 250 cc in total. This is a impregnation solution (S1).

95 g of the carrier (B2) was soaked with 47.5 cc of the impregnation solution (S1), which had been diluted with pure water to be comparable to the water-absorption of the carrier, under atmospheric pressure, and then calcined at 250° C. for 3 hours. This is catalyst 7. Its composition is shown in Table 4.

EXAMPLE 5

Method 1 of Applying Active Metals to Carrier

Catalyst 8 was produced in the same manner as in Example 4, except that 5 g of polyethylene glycol (molecular weight: 400) was added to the impregnation solution (S1). Its composition is shown in Table 4.

EXAMPLE 6

Method 1 of Applying Active Metals to Carrier

Catalyst 9 was produced in the same manner as in Example 4, except that sulfuric acid serving as a stabilizer was not used herein. Its composition is shown in Table 4.

EXAMPLE 7

Method 2 of Applying Active Metals to Carrier 90 g of a γ-alumina carrier (A1) was soaked with 10 g of 1,3-butanediol and 47.5 g of an aqueous 30 wt. % titanium sulfate solution, which had been diluted with pure water to be 72 cc, under atmospheric pressure, then dried at 120° C. for 16 hours, and thereafter calcined at 500° C. for 4 hours. The carrier was washed in one liter of pure water with stirring, and then dried at 120° C. to prepare a carrier (B3). Active metals were loaded to the carrier (B3) in the same manner as in Example 4. This is catalyst 10. Its composition is shown in Table 4.

EXAMPLE 8

Method 2 of Applying Active Metals to Carrier 100 g of a γ-alumina carrier (A1) was soaked with 50 cc of the impregnation solution (S1) containing 5 g of polyethylene glycol (molecular weight: 400) and having been diluted with pure water to be comparable to the water-absorption of the carrier, under atmospheric pressure, and then dried at 120° C. for 3 hours to prepare a carrier (B4). 105 g of the carrier (B4) was soaked with 42.2 g of an aqueous 30 wt. % titanium sulfate solution, which had been diluted with pure water to be comparable to the water absorption of the carrier, under atmospheric pressure, and then calcined at 250° C. for 3 hours. The carrier was washed in one liter of pure water with stirring, and then dried at 120° C. This is catalyst 11. Its composition is shown in Table 4.

EXAMPLE 9

Method 1 of Applying Active Metals to Carrier

Catalyst 12 was produced in the same manner as in Example 4, except that 19.2 g of diluted hydrochloric acid solution containing 16.5% by weight of titanium tetrachloride was used in place of titanium sulfate and that sulfuric acid was not used. Its composition is shown in Table 4.

EXAMPLE 10

Method 1 of Applying Active Metals to Carrier

Catalyst 7 was produced in the same manner as in Example 4, except that 12.4 g of zirconium oxychloride was used in place of titanium sulfate and that sulfuric acid was not used. Its composition is shown in Table 4.

COMPARATIVE EXAMPLE 4

100 g of the carrier (B1) was soaked with 45 cc of the impregnation solution (S1), which had been diluted with pure water to be comparable to the water absorption of the carrier, under atmospheric pressure, and then calcined at 250° C. for 3 hours. This is catalyst 14. Its composition is shown in Table 4.

COMPARATIVE EXAMPLE 5

90 g of γ-alumina (A1) was soaked with 47.5 g of a 30 wt. % titanium sulfate solution containing 0.5 g of sulfuric acid, which has been diluted with pure water to be comparable to the water absorption of the γ-alumina, under atmospheric pressure, then dried at 120° C. for 16 hours, and thereafter calcined at 600° C. for 4 hours to prepare a carrier (B5). 95 g of the carrier (B5) was soaked with the impregnation solution (S1), which had been diluted with pure water to be comparable to the water absorption of the carrier, under atmospheric pressure, and then calcined at 250° C. for 3 hours. This is catalyst 9. Its composition is shown in Table 4.

Hydrogenation of Gas Oil Fraction 100 cc of any of the catalysts was filled into the reactor tube of a fixed bed flow system. Along with hydrogen gas, feed oil was introduced into the reactor tube from its bottom to thereby make it flow upward in the system in a mode of up-flow, and its reactivity with the catalyst was evaluated. Prior to this, feed oil (straight-run light gas oil (LGO) from the Middle East), of which the properties are shown in Table 5, was, along with hydrogen gas, introduced into the system at 250° C. for 24 hours, to thereby pre-sulfurize the catalyst. After the catalyst was thus pre-sulfurized, feed oil (straight-run light gas oil (LGO) from the Middle East) of the same type as above was, along with hydrogen gas, introduced into the reactor tube, and hydrogenated. The reaction temperature was 330° C.; the hydrogen partial pressure was 5 MPa; the ratio of hydrogen/crude oil was 250 $Nm^3/kl$; and LHSV was 2.0 $hr^{-1}$. The relative activity of each catalyst tested, relative to the activity of the catalyst of Comparative Example 1 (catalyst 14) of being 100, is shown in Table 6. Precisely, the desulfurization activity and the denitrogenation activity of each catalyst are in terms of the relative reaction rate of the feed oil with each catalyst, relative to the reaction rate thereof with the comparative catalyst of being 100; and the dearomatization activity of each catalyst is in terms of the relative saturation ratio in the oil processed with each catalyst, relative to that in the oil processed with the comparative catalyst of being 100.

From Table 6, it is understood that the catalysts produced according to the production method of the invention all have improved desulfurization activity, denitrogenation activity and dearomatization activity.

EXAMPLE 11

(1) Preparation of Catalyst:

100 g of a γ-alumina carrier (A1) having a water absorption of 0.8 cc/g was soaked with 10 g of 1,3-butanediol (boiling point: 204° C.) having been diluted with pure water to be 80 cc, and dried at 120° C. for 16 hours to prepare a carrier (B1). On the other hand, 13 g (0.12 mols) of diethanolamine was added to 80 cc of isopropyl alcohol and stirred to give a uniform mixture, to which was added 35.5 g (0.12 mols) of tetra-n-isopropoxy-titanium and stirred at room temperature for 1 hour to prepare a solution (T1). Next, 100 g of the carrier (B1) was soaked with 50 cc of the solution (T1) that had been diluted with isopropyl alcohol to be comparable to the water absorption of the carrier, under atmospheric pressure, then dried at 70° C. in vacuum for 1 hour and at 120° C. for 3 hours, and thereafter calcined at 500° C. for 4 hours to prepare a carrier (C1).

Next, 49 g of cobalt carbonate, 97 g of molybdenum trioxide and 90 g of malic acid were added to 250 cc of pure water and dissolved therein with stirring at 80° C. The solution was cooled to room temperature, and pure water was added thereto to make 250 cc in total. This is impregnation solution (S1).

100 g of the carrier (C1) was soaked with 50 cc of the impregnation solution (S1) having been diluted with pure water to be comparable to the water absorption of the carrier, under atmospheric pressure, and this was heated at 120° C. for 16 hours and then at 500° C. for 3 hours. This is catalyst 16. Its physical properties are shown in Table 7.

EXAMPLE 12

(1) Preparation of Catalyst:

Catalyst 17 was produced in the same manner as in Example 11, except that polyethylene glycol (molecular weight: 400, decomposition point: higher than 250° C.) was used in place of 1,3-butanediol to prepare a carrier (C2) for it. Its physical properties are shown in Table 7.

EXAMPLE 13

(1) Preparation of Catalyst:

Catalyst 18 was produced in the same manner as in Example 11, except that the carrier processed to carry the active metals was heated at 120° C. for 16 hours. Its physical properties are shown in Table 7.

EXAMPLE 14

In the same manner as in Example 11, a carrier (B2) was prepared, using 1,4-butanediol (boiling point: 235° C.) in place of 1,3-butanediol. An aqueous solution of commercially-available titanium sulfate (corresponding to 5.26 g in terms of $TiO_2$) was diluted to be comparable to the water absorption of the carrier, and the carrier was soaked with the diluted solution under atmospheric pressure, and dried in vacuum at 70° C. for 1 hour and then in a drier at 120° C. for 3 hours, and thereafter calcined at 500° C. for 4 hours. Next, this was dried with water (30 times the carrier) at 50° C. to remove the sulfate, and thereafter dried at 120° C. for 16 hours to prepare a carrier (C3).

Next, 50 g of nickel carbonate, 97 g of molybdenum trioxide and 25 g of ortho-phosphoric acid (purity: 80% by weight) were added to 250 cc of pure water, and dissolved therein with stirring at 80° C. Then, this was cooled to room temperature, and pure water was added thereto to make 250 cc in total. This is an impregnation solution (S2).

50 cc of the impregnation solution (S2) was diluted with pure water to be comparable to the water absorption of the carrier (C3), and 100 g of the carrier (C3) was soaked therein under atmospheric pressure, and heated at 120° C. for 16 hours and then at 250° C. for 3 hours. This is catalyst 19. Its physical properties are shown in Table 7.

COMPARATIVE EXAMPLE 6

(1) Preparation of Catalyst:

In the same manner as in Example 11 but with no pretreatment of the carrier (A1) with 1,3-butanediol, 100 g of the carrier (A1) was soaked with the solution (T1) having been diluted with isopropyl alcohol to be comparable to the water absorption of the carrier, under atmospheric pressure, and dried in vacuum at 70° C. for 1 hour and then at 120° C. for 3 hours, and thereafter calcined at 500° C. for 4 hours to prepare a carrier (C4). Next, 100 g of the carrier (C4) was soaked with 50 cc of the impregnation solution (S1), which had been diluted with pure water to be comparable to the water absorption of the carrier, under atmospheric pressure, and heated at 120° C. for 16 hours and then at 500° C. for 3 hours. This is catalyst 20. Its physical properties are shown in Table 7.

COMPARATIVE EXAMPLE 7

(1) Preparation of Catalyst:

Catalyst 21 was produced in the same manner as in Example 11, except that n-amyl alcohol (boiling point: 137° C.) and not 1,3-butanediol was used to prepare a carrier (C5). Its physical properties are shown in Table 7.

COMPARATIVE EXAMPLE 8

Catalyst 22 was produced in the same manner as in Comparative Example 6, except that the carrier processed to carry the active metals was heated at 120° C. for 16 hours. Its physical properties are shown in Table 7.

COMPARATIVE EXAMPLE 9

Catalyst 23 was produced in the same manner as in Example 14, except that the starting carrier was not pretreated with 1,4-butanediol to prepare a carrier (C6). Its physical properties are shown in Table 7.

(2) Evaluation of Catalysts:

EPMA of Carriers (C1) to (C6)

The carriers (C1) to (C6) prepared in the process of producing catalysts were separately embedded in a resin (PMMA: polymethyl methacrylate), and each piece was cut in parallel with its bottom to give a test pellet as in FIG. 2. Using an ordinary EPMA device, each test pellet was analyzed to obtain its value x. The accelerated voltage applied was 1.5 kV; the beam size was 1 μm; and the electric current passing through the sample was 0.05 μA. The test results are given in Table 9.

Hydro-desulfurization of Gas Oil Fraction 100 cc of any of the catalysts 16 to 23 was filled into the reactor tube of a fixed bed flow system. Along with hydrogen gas, feed oil was introduced into the reactor tube from its bottom to thereby make it flow upward in the system in a mode of up-flow, and its reactivity with the catalyst was evaluated. Prior to this, feed oil (straight-run light gas oil (LGO) from the Middle East), of which the properties are shown in Table 8, was, along with hydrogen gas, introduced into the system at 250° C. under a hydrogen partial pressure of 5 MPa for 24 hours, to thereby pre-sulfurize the catalyst. After the catalyst was thus pre-sulfurized, feed oil (straight-run light gas oil (LGO) from the Middle East) of the same type as above was, along with hydrogen gas, introduced into the reactor tube, and hydro-desulfurized. The reaction temperature was from 340 to 360° C.; the hydrogen partial pressure was 5 MPa; the ratio of hydrogen/feed oil was 250 $Nm^3/kl$; and LHSV was 2.0 $hr^{-1}$. The relative activity of each catalyst tested, relative to the desulfurization rate constant of the catalyst of Comparative Example 6 (catalyst 20) of being 100, is shown in Table 9.

From Table 9, it is understood that the catalysts of the Examples in which the value x of the carrier C is larger than 0.5 all have a high desulfurization activity.

EXAMPLE 15

500 g of titanium tetrachloride and one liter of pure water were kept cooled with ice in water in different cooling tanks. With the pure water being stirred and cooled, the titanium tetrachloride cooled was gradually dropwise added thereto to give a colorless titania hydrochloride sol. 1.2 times equivalent, to the titania sol, of aqueous ammonia (concentration: 1 mol/liter) was dropwise added to the titania sol, and stirred for 1 hour, and titanium hydroxide gel was thus formed. The gel was taken out through filtration under suction, and again dispersed in about 1 liter of pure water, and washed through filtration. This operation was repeated four or five times until the wash waste became neutral, whereby the chloride was removed from the gel.

11 g, in terms of titania, of the titanium hydroxide gel was metered. 50 cc of aqueous 25 wt. % ammonia was added thereto, and stirred. Then, 100 cc of aqueous 30% hydrogen peroxide was gradually added thereto to dissolve the titania gel therein, and this gave a peroxotitanium solution. 29 g of citric acid monohydrate was gradually added to this, and then gradually heated up to 50° C. with stirring to remove the excess hydrogen peroxide. At 80° C., this was concentrated to be 117 cc of an yellowish orange transparent solution. This is ammonium titanium-peroxocitrate (T15).

100 g of a γ-alumina carrier (A15) having a water absorption of 0.8 cc/g was soaked with 60 cc of the aqueous solution of T15 (this was previously diluted with pure water to be comparable to the water absorption of the carrier) under atmospheric pressure, then dried in vacuum at 70° C. for 1 hour and thereafter in a drier at 120° C. for 3 hours, and calcined at 500° C. for 4 hours to prepare a carrier (B15).

On the other hand, 250 cc of pure water was added to 37 g of nickel carbonate (20 g in terms of NiO), 83 g of molybdenum trioxide and 38 g of ortho-phosphoric acid (purity: 85% by weight), and stirred at 80° C. to dissolve them. After this was cooled to room temperature, pure water was added thereto to make 250 cc in total. This is an impregnation solution (S15).

50 cc of the impregnation solution S15 was metered, to which was added 6 g of polyethylene glycol (molecular weight: 400). Then, this was diluted with pure water to be comparable to the water absorption of the carrier (B15). 100 g of the carrier (B15) was soaked with the thus-diluted impregnation solution (S15) under atmospheric pressure, then dried in vacuum at 70° C. for 1 hour and at 120° C. for 3 hours, and thereafter calcined at 500° C. for 3 hours. This is catalyst 24.

Its physical properties are shown in Table 10.

EXAMPLE 16

Catalyst 15 was produced in the same manner as in Example 15, except that the carrier processed with the impregnation solution S15 was calcined at 250° C. for 3 hours.

Its physical properties are shown in Table 10.

COMPARATIVE EXAMPLE 10

13 g of diethanolamine was added to 80 cc of isopropyl alcohol and stirred to give a uniform mixture. 35.5 g of titanium tetraisopropoxide (TTIP) was added thereto, and stirred at room temperature for 1 hour to prepare a solution (T1).

100 g of a γ-alumina carrier (A15) having a water absorption of 0.8 cc/g was soaked with 50 cc of the solution (T16) which had been diluted with isopropyl alcohol to be comparable to the water absorption of the carrier, under atmospheric pressure, then dried in vacuum at 70° C. for 1 hour and then in a drier at 120° C. for 3 hours, and thereafter calcined at 500° C. for 4 hours to prepare a carrier (B16).

The impregnation solution (S15) was prepared in the same manner as in Example 15, and 50 cc of the solution was metered. 6 g of polyethylene glycol (molecular weight: 400) was added to this, which was then diluted with pure water to be comparable to the water absorption of the titanium-added alumina carrier (B16). 100 g of the carrier (B16) was soaked with the thus-diluted solution under atmospheric pressure, then dried in vacuum at 70° C. for 1 hour and then at 120° C. for 3 hours, and thereafter calcined at 500° C. for 3 hours. This is catalyst 26.

Its physical properties are shown in Table 10.

Hydrogenation of Bottom Oil (Residue)

100 cc of any of the catalysts 24 to 26 was filled into the reactor tube of a high-pressure fixed bed flow system. With DMDS (dimethyl disulfide) added thereto, LGO (straight-run light gas oil from the Middle East), of which the properties are shown in Table 8, was processed to have a sulfur content of 2.5% by weight. Along with hydrogen gas, the thus-processed LGO was introduced into the system at 250° C. under a hydrogen partial pressure of 13.5 MPa for 24 hours, to thereby pre-sulfurize the catalyst. With that, feed oil, atmospheric residue from the Middle East, of which the properties are shown in Table 11, was hydrogenated in the system.

Concretely, the feed oil of Table 11 was, along with hydrogen, introduced into the reactor tube from its bottom to thereby make it flow upward in the system in a mode of up-flow, and it was hydrogenated therein. The reaction condition is as follows:

Hydrogen partial pressure: 13.5 MPa
Liquid hourly space velocity (LHSV): 0.3 hr$^{-1}$
Hydrogen/oil ratio: 850 Nm$^3$/kL
Reaction temperature: 370° C.

The results are given in Table 12.

EXAMPLE 17

750 g of ammonium Y-type zeolite (Na$_2$O content: 1.3% by weight, SiO$_2$/Al$_2$O$_3$ molar ratio: 5.0) was put into a rotary kiln, and heated therein at 700° C. for 3 hours to be steaming zeolite A. 500 g of the zeolite A was suspended in 6 liters of deionized water, and, with stirring at 75° C., 2000 g of an aqueous 10 wt. % nitric acid solution was added thereto over a period of 30 minutes. After the addition, this was filtered, and the resulting solid was washed with 20 times (by weight) of deionized water to be acid-processed Y-type zeolite B. Its physical properties are shown in Table 13.

On the other hand, 70 g of sodium hydroxide was dissolved in 2 liters of pure water. 200 g of sodium aluminate was added thereto to give a uniform alumina solution V. Still on the other hand, 1000 g of aluminium nitrate was dissolved in 2 liters of pure water to give an alumina solution W. Four liters of pure water was heated at 70° C., and with stirring, the alumina solution V was added thereto, until the pH of the resulting solution reached 3.6. Next, the alumina solution W was added to it, until the pH of the resulting solution reached 9.0. Then, this was aged with stirring for 5 minutes. The operation of varying the pH from 3.6 to 9.0 was repeated 6 times in all. Next, the resulting gel was filtered, and the residue was washed to obtain alumina gel Z.

The acid-treated zeolite B was suspended in deionized water in 1/1 by weight. Along with this, the alumina gel Z was introduced into a kneader in a ratio, zeolite B/solid alumina of 10/90 by weight, heated and concentrated with stirring therein to have a concentration enough for extrusion molding. Through an extruder, this was pelletized into columnar pellets having a size of 1.6 mm. Next, this was dried at 110° C. for 16 hours, and then calcined at 550° C. for 3 hours. This is carrier I.

On the other hand, an ammonium titanium-peroxocitrate solution (T15) was prepared in the same manner as in Example 15.

Next, 100 g of the Y-type zeolite-containing alumina carrier I was soaked with 60 cc of the aqueous T15 solution that had been diluted with pure water to be comparable to the water absorption of the carrier, under atmospheric pressure, and heated in vacuum at 70° C. for 1 hour and then at 120° C. for 3 hours, and thereafter calcined at 500° C. for 4 hours to prepare a carrier (C17).

On the other hand, a suspension of molybdenum trioxide and nickel carbonate in deionized water was heated at 90° C., and malic acid was added thereto to give a impregnation solution. The carrier C17 was soaked with the solution so that the resulting catalyst could contain 15.1% by weight, in terms of MoO$_3$, of molybdenum, and 4.0% by weight, in terms of NiO, of nickel. Then, this was dried at 120° C. for 3 hours, and calcined at 500° C. for 3 hours. This is catalyst 27.

The physical properties of the catalyst 27 are shown in Table 14.

COMPARATIVE EXAMPLE 11

A Y-type zeolite-containing alumina carrier I was prepared in the same manner as in Example 17.

On the other hand, 13 g of diethanolamine was added to 80 cc of isopropyl alcohol, and stirred to give a uniform solution. 35.5 g of titanium tetraisopropoxide (TTIP) was added thereto at room temperature, and stirred for 1 hour to prepare a solution (T11).

Next, 100 g of the Y-type zeolite-containing alumina carrier I was soaked with the solution (T11) that had been diluted with isopropyl alcohol to be comparable to the water absorption of the carrier, under atmospheric pressure, then dried in vacuum at 70° C. for 1 hour and then in a drier at 120° C. for 3 hours, and thereafter calcined at 500° C. for 4 hours to prepare a carrier (B11).

In the same manner as in Example 17, the carrier B11 was processed to thereby carry nickel and molybdenum. This is catalyst 28.

The physical properties of the catalyst 28 are shown in Table 14.

Hydro-cracking of Heavy Gas Oil 100 cc of any of the catalyst 27 or 28 was filled into the reactor of a high-pressure fixed bed flow system. With DMDS (dimethyl disulfide) added thereto, LGO (straight-run light gas oil from the Middle East), of which the properties are shown in Table 8, was processed to have a sulfur content of 2.5% by weight. Along with hydrogen gas, the thus-processed LGO was introduced into the system at 250° C. under a hydrogen partial pressure of 11.0 MPa for 24 hours, to thereby pre-sulfurize the catalyst. With that, feed oil, heavy gas oil, of which the properties are shown in Table 15, was hydrogenated in the system.

Concretely, the feed oil was, along with hydrogen, introduced into the reactor tube from its bottom to thereby make it flow upward in the system in a mode of up-flow, and it was hydrogenated therein. The reaction condition is as follows:

Hydrogen partial pressure: 11.0 MPa
Liquid hourly space velocity (LHSV): 1.0 hr$^{-1}$
Hydrogen/oil ratio: 1000 Nm$^3$/kL
Reaction temperature: 385° C.

The results are given in Table 16.

TABLE 1

|  |  | Catalyst | | |
|---|---|---|---|---|
|  |  | Catalyst 1 | Catalyst 2 | Catalyst 3 |
| Composition wt. % | NiO | 5.0 | 5.1 | 5.1 |
|  | MoO$_3$ | 28.2 | 28.3 | 28.3 |
|  | P$_2$O$_5$ | 2.5 | 2.6 | 2.6 |
|  | TiO$_2$ | 3.2 | 3.3 | 3.3 |
|  | Al$_2$O$_3$ | 61.1 | 60.7 | 60.7 |
| Mean Pore Diameter (PD) angstrom | | 85 | 85 | 85 |
| Specific Surface Area (SA) m$^2$/g | | 250 | 248 | 245 |
| Total Pore Volume cc/g | | 0.53 | 0.52 | 0.52 |

TABLE 1-continued

|  |  | Catalyst | | |
|---|---|---|---|---|
|  |  | Catalyst 4 | Catalyst 5 | Catalyst 6 |
| Composition wt. % | NiO | 5.1 | 5.1 | 5.1 |
|  | MoO$_3$ | 28.2 | 28.3 | 28.3 |
|  | P$_2$O$_5$ | 2.5 | 2.4 | 2.4 |
|  | TiO$_2$ | 0 | 3.2 | 3.2 |
|  | Al$_2$O$_3$ | 64.2 | 61.0 | 61.0 |
| Mean Pore Diameter (PD) angstrom | | 84 | 85 | 91 |
| Specific Surface Area (SA) m$^2$/g | | 255 | 248 | 198 |
| Total Pore Volume cc/g | | 0.54 | 0.52 | 0.45 |

TABLE 2

| Specific Gravity (15/4° C.) | 0.8544 |
|---|---|
| Sulfur Content wt. % | 1.3 |
| Nitrogen Content ppm | 90 |
| Total Volume of Aromatics % | |
| mono-cyclic aromatics | 15.1 |
| 2-cyclic and more multi-cyclic aromatics | 12.4 |
| Distillation Characteristics ° C. | |
| initial boiling point | 200 |
| 90% point | 365 |
| end point | 390 |

TABLE 3

|  | Catalyst | Relative Desulfurization Activity |
|---|---|---|
| Example 1 | Catalyst 1 | 150 |
| Example 2 | Catalyst 2 | 151 |
| Example 3 | Catalyst 3 | 128 |
| Comparative Example 1 | Catalyst 4 | 100 |
| Comparative Example 2 | Catalyst 5 | 110 |
| Comparative Example 3 | Catalyst 6 | 105 |

TABLE 4

|  |  | method of applying active metals to carrier | NiO | MoO$_3$ | P$_2$O$_5$ | TiO$_2$, ZrO$_2$ | Al$_2$O$_3$ |
|---|---|---|---|---|---|---|---|
| Example 4 | Catalyst 7 | 1 | 4.5 | 15.6 | 4.0 | 5.1 | 70.8 |
| Example 5 | Catalyst 8 | 1 | 4.5 | 15.5 | 4.0 | 5.0 | 71.0 |
| Example 6 | Catalyst 9 | 1 | 4.5 | 15.4 | 4.1 | 4.8 | 71.2 |
| Example 7 | Catalyst 10 | 2 | 4.4 | 15.5 | 4.0 | 5.0 | 71.1 |
| Example 8 | Catalyst 11 | 3 | 4.4 | 15.4 | 4.0 | 5.1 | 71.1 |
| Example 9 | Catalyst 12 | 1 | 4.4 | 15.6 | 3.9 | 4.9 | 71.2 |
| Example 10 | Catalyst 13 | 1 | 4.5 | 15.5 | 4.1 | 5.0 | 70.9 |
| Comp. Ex. 4 | Catalyst 14 | — | 4.4 | 15.6 | 4.1 | 0 | 75.9 |
| Comp. Ex. 5 | Catalyst 15 | — | 4.5 | 15.5 | 4.1 | 5.0 | 70.9 |

TABLE 5

| | |
|---|---|
| Specific Gravity (15/4° C.) | 0.8490 |
| Sulfur Content wt. % | 1.03 |
| Nitrogen Content ppm | 88 |
| Total Volume of Aromatics % | |
| mono-cyclic aromatics | 14.4 |
| 2-cyclic and 3-cyclic aromatics | 11.3 |
| Distillation Characteristics ° C. | |
| initial boiling point | 118 |
| 90% point | 370 |
| end point | 413 |

TABLE 6

| | Desulfurization Activity (%) | Denitrogenation Activity (%) | Dearomatization Activity (%) |
|---|---|---|---|
| Example 4 | 174 | 144 | 106 |
| Example 5 | 184 | 151 | 110 |
| Example 6 | 166 | 144 | 106 |
| Example 7 | 147 | 186 | 113 |
| Example 8 | 145 | 153 | 124 |
| Example 9 | 179 | 142 | 108 |
| Example 10 | 178 | 153 | 111 |
| Comp. Ex. 4 | 100 | 100 | 100 |
| Comp. Ex. 5 | 128 | 115 | 103 |

TABLE 7

| | | Catalyst | | | |
|---|---|---|---|---|---|
| | | Catalyst 16 | Catalyst 17 | Catalyst 18 | Catalyst 19 |
| Composition wt. % | CoO | 4.5 | 4.4 | 4.5 | — |
| | NiO | — | — | — | 4.3 |
| | $MoO_3$ | 15.5 | 15.6 | 15.5 | 14.6 |
| | $P_2O_5$ | — | — | — | 2.4 |
| | $TiO_2$ | 4.0 | 4.1 | 4.0 | 3.8 |
| | $Al_2O_3$ | 76.0 | 75.9 | 76.0 | 74.9 |
| Mean Pore Diameter (PD) Angstrom | | 85 | 85 | 85 | 86 |
| Specific Surface Area (SA) $m^2/g$ | | 250 | 245 | 250 | 247 |
| Total Pore Volume cc/g | | 0.53 | 0.52 | 0.53 | 0.53 |

| | | Catalyst | | | |
|---|---|---|---|---|---|
| | | Catalyst 20 | Catalyst 21 | Catalyst 22 | Catalyst 23 |
| Composition wt. % | CoO | 4.6 | 4.4 | 4.6 | — |
| | NiO | — | — | — | 4.3 |
| | $MoO_3$ | 15.4 | 15.6 | 15.4 | 14.6 |
| | $P_2O_5$ | — | — | — | 2.4 |
| | $TiO_2$ | 0.9 | 3.8 | 0.9 | 3.8 |
| | $Al_2O_3$ | 79.1 | 76.2 | 79.1 | 74.9 |
| Mean Pore Diameter (PD) Angstrom | | 85 | 84 | 85 | 85 |
| Specific Surface Area (SA) $m^2/g$ | | 255 | 253 | 255 | 250 |
| Total Pore Volume cc/g | | 0.54 | 0.53 | 0.54 | 0.53 |

TABLE 8

| | |
|---|---|
| Specific Gravity (15/4° C.) | 0.8490 |
| Sulfur Content wt. % | 1.03 |
| Nitrogen Content ppm | 88 |
| Total Volume of Aromatics % | |
| mono-cyclic aromatics | 14.4 |
| 2-cyclic and 3-cyclic aromatics | 11.3 |
| Distillation Characteristics ° C. | |
| initial boiling point | 118 |
| 90% point | 370 |
| end point | 413 |

TABLE 9

| | x of Carrier C | Catalyst | Relative Hydro-desulfurization Activity |
|---|---|---|---|
| Example 11 | 0.64 | Catalyst 16 | 130 |
| Example 12 | 0.56 | Catalyst 17 | 120 |
| Example 13 | 0.64 | Catalyst 18 | 135 |
| Example 14 | 0.85 | Catalyst 19 | 138 |
| Comp. Ex. 6 | 0.00 | Catalyst 20 | 100 |
| Comp. Ex. 7 | 0.40 | Catalyst 21 | 105 |
| Comp. Ex. 8 | 0.00 | Catalyst 22 | 105 |
| Comp. Ex. 9 | 0.20 | Catalyst 23 | 108 |

TABLE 10

| | Catalyst 24 | Catalyst 25 | Catalyst 26 |
|---|---|---|---|
| NiO wt. % | 3.2 | 3.1 | 3.2 |
| $MoO_3$ wt. % | 13.2 | 13.2 | 13.3 |
| $P_2O_5$ wt. % | 3.8 | 3.9 | 4.0 |
| $TiO_2$ wt. % | 4.0 | 3.9 | 0.9 |
| $Al_2O_3$ wt. % | 75.8 | 75.9 | 78.6 |

TABLE 10-continued

|  | Catalyst 24 | Catalyst 25 | Catalyst 26 |
|---|---|---|---|
| Mean Pore Diameter, angstrom | 126 | 125 | 124 |
| Surface Area, m$^2 \cdot$ g$^{-1}$ | 184 | 183 | 190 |
| Pore Volume, cc $\cdot$ g$^{-1}$ | 0.58 | 0.57 | 0.59 |
| x | 0.64 | 0.64 | 0.0 |

TABLE 11

| Properties of Crude Oil | |
|---|---|
| Specific Gravity | 0.9621 |
| Kinematic Viscosity (50° C.) | 290 cst |
| Sulfur | 3.48 wt. % |
| Nitrogen | 1840 ppm |
| Residual Carbon | 9.33 wt. % |
| Asphalthene | 2.98% |
| V | 37.6 ppm |
| Ni | 10.8 ppm |

TABLE 12

|  | Catalyst 24 | Catalyst 25 | Catalyst 26 |
|---|---|---|---|
| Sulfur Content wt. % | 0.22 | 0.20 | 0.27 |
| Nitrogen Content wt. % | 620 | 600 | 800 |

TABLE 13

|  | Y-type Zeolite B |
|---|---|
| Lattice Constant, angstrom | 24.39 |
| SiO$_2$/Al$_2$O$_3$ molar ratio | 8.7 |
| Specific Surface Area | 752 |

TABLE 14

|  | Catalyst 27 | Catalyst 28 |
|---|---|---|
| NiO wt. % | 4.0 | 4.1 |
| MoO$_3$ wt. % | 15.1 | 15.1 |
| TiO$_2$ wt. % | 4.0 | 0.9 |
| Mean Pore Diameter, angstrom | 103 | 104 |
| Surface Area, m$^2 \cdot$ g$^{-1}$ | 267 | 275 |
| Pore Volume, cc $\cdot$ g$^{-1}$ | 0.57 | 0.58 |
| x | 6.4 | 0.0 |

TABLE 15

|  | Heavy Gas Oil |
|---|---|
| Specific Gravity | 0.906 |
| Sulfur Content, wt. % | 2.63 |
| Nitrogen Content, ppm | 590 |
| Conradson Carbon Residual, wt. % | 0.06 |
| Viscosity (at 50° C.), cst | 16 |
| Fraction at higher than 360° C., wt. % | 82 |

TABLE 16

|  | Catalyst 27 | Catalyst 28 |
|---|---|---|
| Reaction Temperature (° C.) | 385 | 385 |
| Cracking of Fraction at higher than 360° C. (wt. %) | 36 | 35 |
| Intermediate Fraction Yield | 36 | 34 |

Intermediate Fraction: at 120 to 360° C.

INDUSTRIAL APPLICABILITY

The hydrogenation catalyst of the invention has improved and higher desulfurization activity, denitrogenation activity and dearomatization activity than conventional catalysts, and are effective for hydrogenation of hydrocarbon oil, especially gas oil. In the metal compound-loading refractory inorganic oxide carrier of the invention, the metal exists uniformly everywhere inside it, and the value x of the carrier measured through EPMA is at least 0.5. Therefore, when the carrier carries active metals to be a hydrogenation catalyst, the catalyst has high desulfurization activity.

The invention claimed is:

1. A method for producing a hydrogenation catalyst, which comprises impregnating a refractory inorganic oxide carrier with a solution comprising a water-soluble titanium compound, then further impregnating with an aqueous solution comprising at least one metal compound of Group 6 and at least one metal compound of Groups 8 to 10 of the Periodic Table, and thereafter heating the impregnated carrier at a temperature not higher than 300° C., wherein the titanium compound is a salt of a titanium-peroxohydroxycarboxylic acid.

2. The method for producing a hydrogenation catalyst as claimed in claim 1, wherein the refractory inorganic oxide is alumina.

3. The method for producing a hydrogenation catalyst as claimed in claim 2, wherein the alumina is γ-alumina having a mean pore size of between 50 and 150 angstroms.

4. The method for producing a hydrogenation catalyst as claimed in claim 1, wherein the amount of titanium in terms of its oxide form falls between 1 and 15% by weight of the refractory inorganic oxide carrier.

5. The method for producing a hydrogenation catalyst as claimed in claim 1, wherein the metal of Group 6 of the Periodic Table is molybdenum and the metal of Groups 8 to 10 of the Periodic Table is nickel.

6. The method for producing a hydrogenation catalyst as claimed in claim 1, wherein the hydrogenation catalyst carries a phosphorus compound along with the metal compound of Group 6 and the metal compound of Groups 8 to 10 of the Periodic Table.

7. The method for producing a hydrogenation catalyst as claimed in claim 6, wherein the amount of phosphorus compound in terms of its oxide form falls between 1 and 6% by weight of the catalyst.

8. The method for producing a hydrogenation catalyst as claimed in claim 1, wherein the amount of the at least one metal compound of Group 6 in terms of its oxide form falls between 8 and 35% by weight of the catalyst.

9. The method for producing a hydrogenation catalyst as claimed in claim 1, wherein the amount of the at least one metal compound of Groups 8 to 10 in terms of its oxide form falls between 2 and 10% by weight of the catalyst.

10. A method for producing a hydrogenation catalyst, which comprises impregnating a refractory inorganic oxide carrier with an aqueous solution comprising a salt of a titanium-peroxohydroxycarboxylic acid, then further impregnating with an aqueous solution comprising at least one metal compound of Group 6 and at least one metal compound of Groups 8 to 10 of the Periodic Table.

11. The method for producing a hydrogenation catalyst as claimed in claim 10, wherein the amount of titanium in terms of its oxide form falls between 1 and 15% by weight of the refractory inorganic oxide carrier.

12. The method for producing a hydrogenation catalyst as claimed in claim 10, wherein the metal of Group 6 of the Periodic Table is molybdenum and the metal of Groups 8 to 10 of the Periodic Table is nickel.

13. The method for producing a hydrogenation catalyst as claimed in claim 10, wherein a phosphorus compound is applied to the refractory inorganic oxide carrier along with the metal compound of Group 6 and the metal compound of Groups 8 to 10 of the Periodic Table.

14. The method for producing a hydrogenation catalyst as claimed in claim 13, wherein the amount of phosphorus compound in terms of its oxide form falls between 1 and 6% by weight of the catalyst.

15. The method for producing a hydrogenation catalyst as claimed in claim 10, wherein the refractory inorganic oxide is alumina.

16. The method for producing a hydrogenation catalyst as claimed in claim 15, wherein the alumina is γ-alumina having a mean pore size of between 50 and 150 angstroms.

17. The method for producing a hydrogenation catalyst as claimed in claim 10, wherein the amount of the at least one metal compound of Group 6 in terms of its oxide form falls between 8 and 35% by weight of the catalyst.

18. The method for producing a hydrogenation catalyst as claimed in claim 10, wherein the amount of the at least one metal compound of Groups 8 to 10 in terms of its oxide form falls between 2 and 10% by weight of the catalyst.

\* \* \* \* \*